United States Patent
Lin

(10) Patent No.: US 10,997,836 B2
(45) Date of Patent: May 4, 2021

(54) SECURITY DEVICE AND SECURITY SYSTEM

(71) Applicant: ARTIFICIAL INTELLIGENCE CO., LTD., Hsinchu (TW)

(72) Inventor: Che Wei Lin, Hsinchu (TW)

(73) Assignee: ARTIFICIAL INTELLIGENCE CO., LTD., Hsinchu (TW)

( * ) Notice: Subject to any disclaimer, the term of this patent is extended or adjusted under 35 U.S.C. 154(b) by 120 days.

(21) Appl. No.: 16/241,290

(22) Filed: Jan. 7, 2019

(65) Prior Publication Data
US 2020/0066124 A1 Feb. 27, 2020

(30) Foreign Application Priority Data

Aug. 27, 2018 (TW) ................................ 107129809

(51) Int. Cl.
| | |
|---|---|
| G08B 13/19 | (2006.01) |
| G08B 13/196 | (2006.01) |
| H04N 7/18 | (2006.01) |
| G06F 3/16 | (2006.01) |
| H04R 3/00 | (2006.01) |
| G06F 13/20 | (2006.01) |
| H04L 29/06 | (2006.01) |

(52) U.S. Cl.
CPC ....... *G08B 13/19663* (2013.01); *G06F 3/165* (2013.01); *G06F 13/20* (2013.01); *H04N 7/181* (2013.01); *H04N 7/183* (2013.01); *H04R 3/00* (2013.01); *H04L 67/42* (2013.01)

(58) Field of Classification Search
CPC .......................... G08B 13/19663; G06F 13/20
See application file for complete search history.

(56) References Cited

U.S. PATENT DOCUMENTS

| | | | | |
|---|---|---|---|---|
| 2011/0024503 A1* | 2/2011 | Kong | ................... | G06K 7/0056 235/441 |
| 2012/0255231 A1* | 10/2012 | Jenkins | ............. | H04W 52/0229 49/358 |
| 2016/0241815 A1* | 8/2016 | Baxter | ................... | H04N 7/181 |

FOREIGN PATENT DOCUMENTS

| | | |
|---|---|---|
| CN | 203812297 | 9/2014 |
| CN | 206388256 U | 8/2017 |
| TW | M487495 | 10/2014 |

(Continued)

OTHER PUBLICATIONS

Office Action and Search Report dated Sep. 23, 2019 issued by Taiwan Intellectual Property Office for counterpart application No. 107129809.

(Continued)

*Primary Examiner* — Girumsew Wendmagegn
(74) *Attorney, Agent, or Firm* — WPAT, P.C., Intellectual Property Attorneys; Anthony King

(57) ABSTRACT

A security device and a security system are provided. The security system includes the security device. The security device includes a first I/O module and a processing unit. The first I/O module is configured to detect an identification within a detection coverage. The processing unit is configured to: determine that the identification is registered with the security device; set the security device as an unalarmed mode when the identification is enabled within the detection coverage of the first I/O module; and set the security device as an alarmed mode when the identification is disabled within the detection coverage of the first I/O module.

10 Claims, 22 Drawing Sheets

(56) References Cited

FOREIGN PATENT DOCUMENTS

TW            M508750          9/2015
TW            201816727        5/2018

OTHER PUBLICATIONS

English Abstract Translation for Foreign Reference TW M487495.
Office Action and Search Report dated Feb. 13, 2019 by Taiwan Intellectual Property Office for counterpart application No. 107129809.
English Abstract Translation of Office Action issued by Taiwan Intellectual Property Office.
English Abstract Translation of Foreign Document TW M508750.
English Abstract Translation of Foreign Document TW 201816727.
Office Action and Search Report dated Mar. 4, 2020 issued by Taiwan Intellectual Property Office for counterpart application No. 107129809.
English Abstract Translation for Foreign Reference CN206388256U.
English Abstract Translation for Foreign Reference CN203812297.

\* cited by examiner

SECURITY DEVICE AND SECURITY SYSTEM

PRIORITY CLAIM AND CROSS-REFERENCE

This application claims the benefit of Taiwan patent application No. 107129809 filed on Aug. 27, 2018, the disclosure of which is hereby incorporated by reference in its entirety.

TECHNICAL FIELD

The present disclosure relates to a security device and a security system, more particularly, to a security device and a security system that provide automatic surveillance.

BACKGROUND

Electronic security systems have become a popular way of securing and monitoring property. For example, more and more electronic security systems are installed at locations of interest such as homes, offices, buildings and structures for the safety and protection of personnel, property and surroundings. While security systems have been useful for detecting certain types of intrusions, vandalism or attempted thefts, there remains an increasing need to improve their convenience of use.

In some existing security systems, electronic surveillance equipment is provided to monitor a specific location. To monitor several locations in an area of interest, these systems involve one guard who monitors a video feed or alarm panel for intrusion or other related alerts. The current development of security systems, however, attempts to do away with human-oriented services and replace the human security guard with advanced technology solutions to security problems.

Moreover, based on the technology solutions being developed for the security problems, varied functions are needed for enhancing the robustness and the flexibility of the security systems.

SUMMARY

Some embodiments of the present disclosure provide a security device. The security device includes a first input/output (I/O) module and a processing unit. The processing unit is electrically coupled to the first I/O module. The first I/O is configured to detect an identification within a detection coverage. The processing unit is configured to: determine that the identification is registered with the security device; set the security device as an unalarmed mode when the identification is enabled within the detection coverage of the first I/O module; and set the security device as an alarmed mode when the identification is disabled within the detection coverage of the first I/O module.

Some embodiments of the present disclosure provide a security system. The security system includes a detection module and a security device. The security device includes a first I/O module and the processing unit. The processing unit is electrically coupled to the first I/O module. The first I/O module is configured to communicate with the detection module. The detection module is configured to detect an identification within a detection coverage. The processing unit is configured to: determine that the identification received from the detection module is registered with the security device; set the security device as an unalarmed mode when the identification is enabled within the detection coverage of the detection module; and set the security device as an alarmed mode when the identification is disabled within the detection coverage of the detection module.

Some embodiments of the present disclosure provide a security system. The security system is communicatively coupled with a remote identification carrier. The security system includes a sensor and a control unit. The sensor is used for monitoring trespassing into a specific field. The control unit is used for receiving an indicating signal from the remote identification carrier to determine to activate or inactivate the sensor while the remote identification carrier is within the specific filed.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
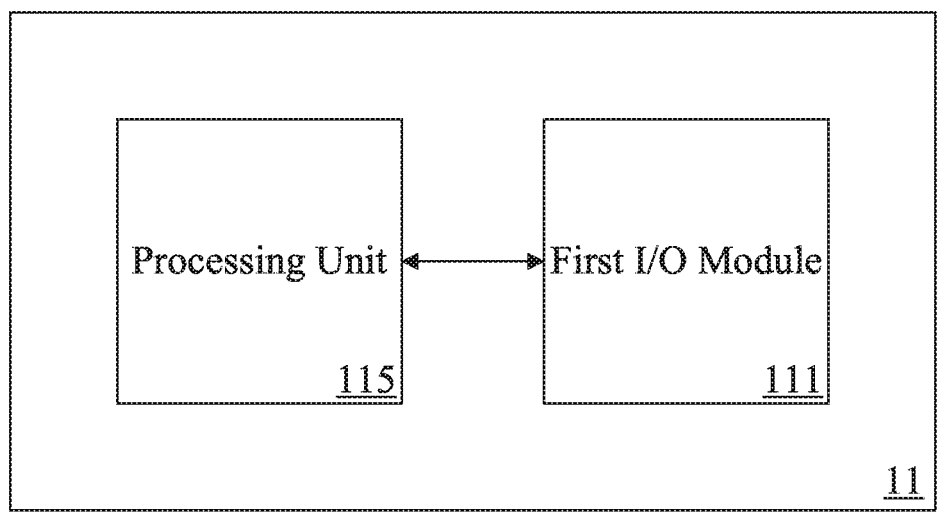
FIG. 1A is a block diagram of the security device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

Figure 1B:
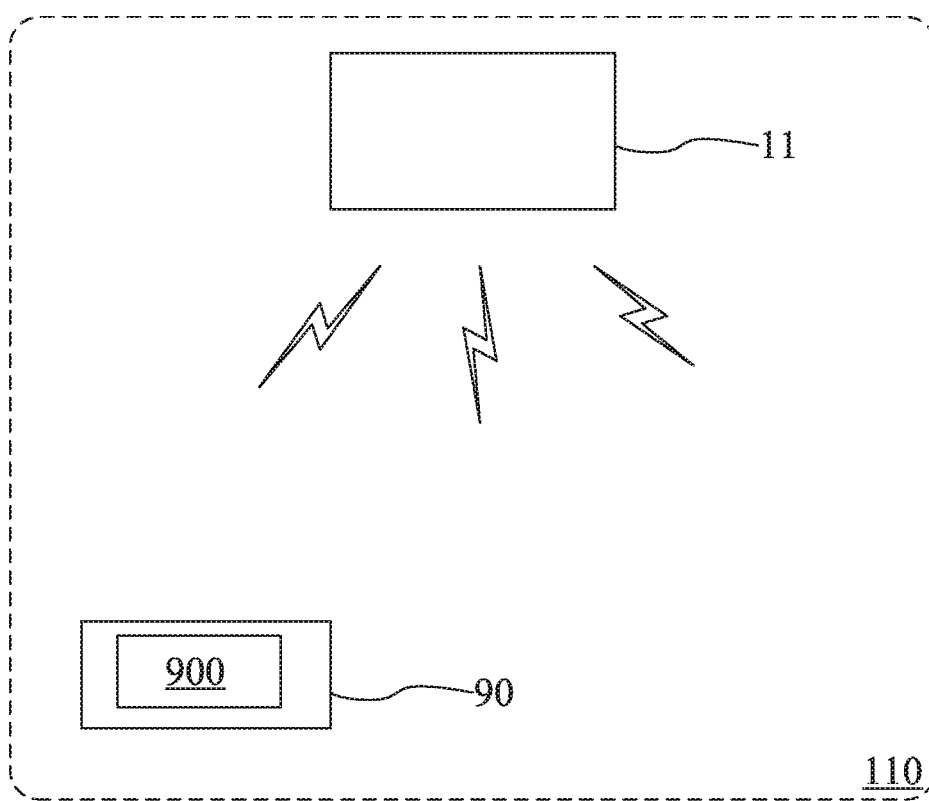
FIG. 1B is a schematic diagram illustrating the applied environment of the security device in accordance with some embodiments of the present disclosure.

Please refer to FIG. 1A and FIG. 1B together. FIG. 1A is a block diagram of a security device 11 in accordance with some embodiments of the present disclosure. The security device 11 includes a first input/output (I/O) module 111 and a processing unit 115. The processing unit 115 is electrically coupled to the first/O module 111. FIG. 1B is a schematic diagram illustrating the applied environment of the security device 11 in accordance with some embodiments of the present disclosure. The security device 11 may be installed or mounted at a location of interest in an area to be protected. Interactions among these elements will be further described hereinafter.

Referring to FIG. 1B, when an object 90 with an identification 900 enters a detection coverage 110 of the first I/O module 111, the first I/O module 111 detects the identification 900 within the detection coverage 110. Then, the processing unit 115 determines whether the identification 900 is registered with the security device 11. In some embodiments, when the identification 900 is registered with the security device 11, it means that the identification 900 may be legal for the security device 11. Accordingly, based on the presence of the legal identification 900 within the detection coverage 110, the processing unit 115 sets the security device 11 as an unalarmed mode (not shown).

In some embodiments, the identification 900 may be enabled or disabled within the detection coverage 110 of the first I/O module 111. In detail, when the identification 900 is enabled within the detection coverage 110 of the first I/O module 111, the processing unit 115 sets the security device 11 as the unalarmed mode. On the other hand, when the identification 900 is disabled within the detection coverage 110 of the first I/O module 11l, the processing unit 115 sets the security device 11 as an alarmed mode (not shown) since the identification 900, which may cause the security device 11 to be set as the unalarmed mode, is considered to be absent within the detection coverage 110 due to the disabled state.

Figure 2A:
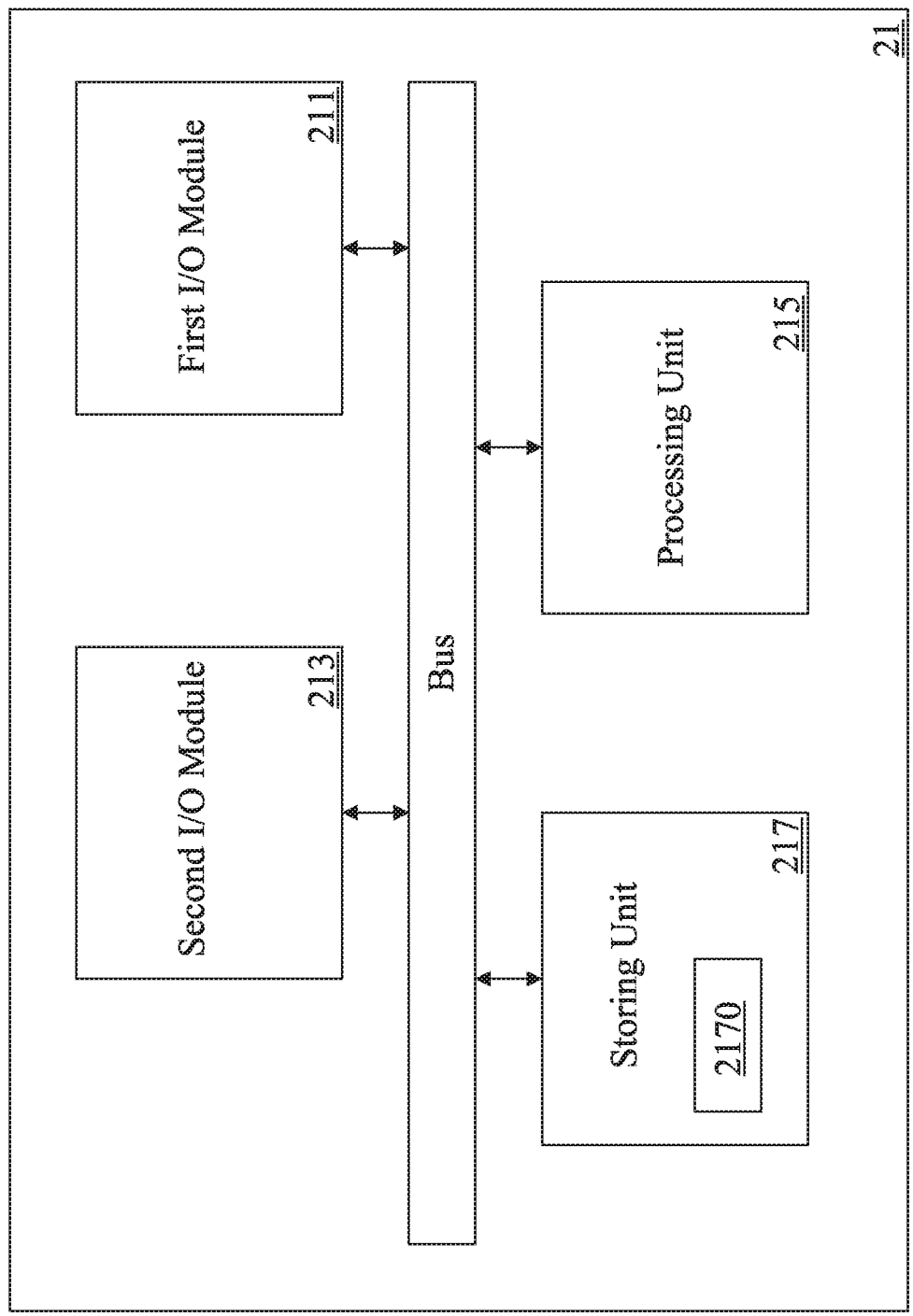
FIG. 2A is a block diagram of the security device in accordance with some embodiments of the present disclosure.
Figure 2B:
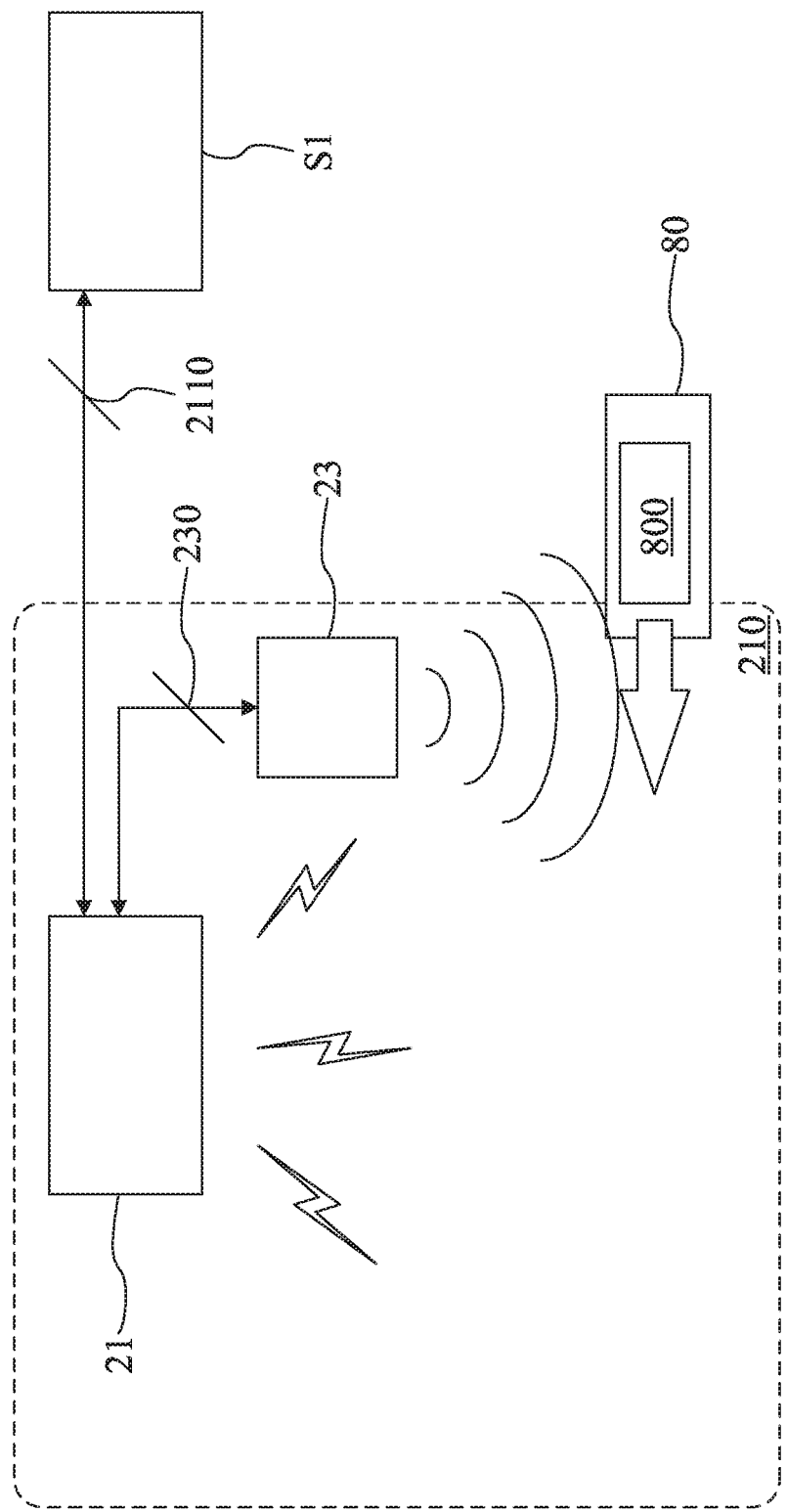
FIG. 2B is a schematic diagram illustrating the applied environment of the security device in accordance with some embodiments of the present disclosure.

Please refer to FIG. 2A and FIG. 2B together. FIG. 2A is a block diagram of a security device 21 in accordance with some embodiments of the present disclosure. The security device 21 includes a first I/O module 211, a second I/O module 213, a processing unit 215 and a storing unit 217. The first I/O module 211, the second I/O module 213, the processing unit 215 and the storing unit 217 are electrically coupled (e.g., electrically coupled via bus). The storing unit 217 stores a list 2170 which recorded identifications of legal devices. FIG. 2B is a schematic diagram illustrating the applied environment of the security device 21 in accordance with some embodiments of the present disclosure. The security device 21 may be installed or mounted at a location of interest in an area to be protected, and communicates with a motion sensor 23 via the first I/O module 211. The motion sensor 23 is disposed for sensing objects which enter a detection coverage 210 of the first I/O module 211. Interactions among these elements will be further described hereinafter.

Referring to FIG. 2B, when an object 80 enters the detection coverage 210 of the first I/O module 211, the motion sensor 23 senses the presence of the object 80, and then transmits a sensing signal 230 to the first I/O module 211 of the security device 21. Then, based on the sensing signal 230, the first I/O module 211 detects whether the object 80 has any identification within the detection coverage 210.

In some embodiments, when the first I/O module 211 detects no identification based on the presence of the object 80 and the security device 21 is set as an alarmed mode, the processing unit 215 transmits an alarmed signal 2110 to a server S1 via the second I/O module 213 for informing the server S1 of potential risk. On the other hand, when the first I/O module 211 detects an identification 800 based on the presence of the object 80, the processing unit 215 determines whether the identification 800 is registered in the list 2170.

In some embodiments, when the identification 800 is not registered in the list 2170 and the security device 21 is set as an alarmed mode, the processing unit 215 transmits the alarmed signal 2110 to the server S1 via the second I/O module 213 for informing the server S1 of potential risk. On the other hand, when the identification 800 is registered in the list 2170, it means that the identification 800 may be legal for the security device 21. Accordingly, based on the presence of the legal identification 800 within the detection coverage 210, the processing unit 215 sets the security device 21 as an unalarmed mode.

In some embodiments, the identification 800 may be enabled or disabled within the detection coverage 210 of the first I/O module 211. In detail, when the identification 800 is enabled within the detection coverage 210 of the first I/O module 211, the processing unit 115 sets the security device 21 as the unalarmed mode. On the other hand, when the identification 800 is disabled within the detection coverage 210 of the first I/O module 211, the processing unit 215 sets the security device 21 as the alarmed mode since the identification 800, which may cause the security device 21 to be set as the unalarmed mode, is considered to be absent within the detection coverage 210 due to the disabled state.

Figure 2C:
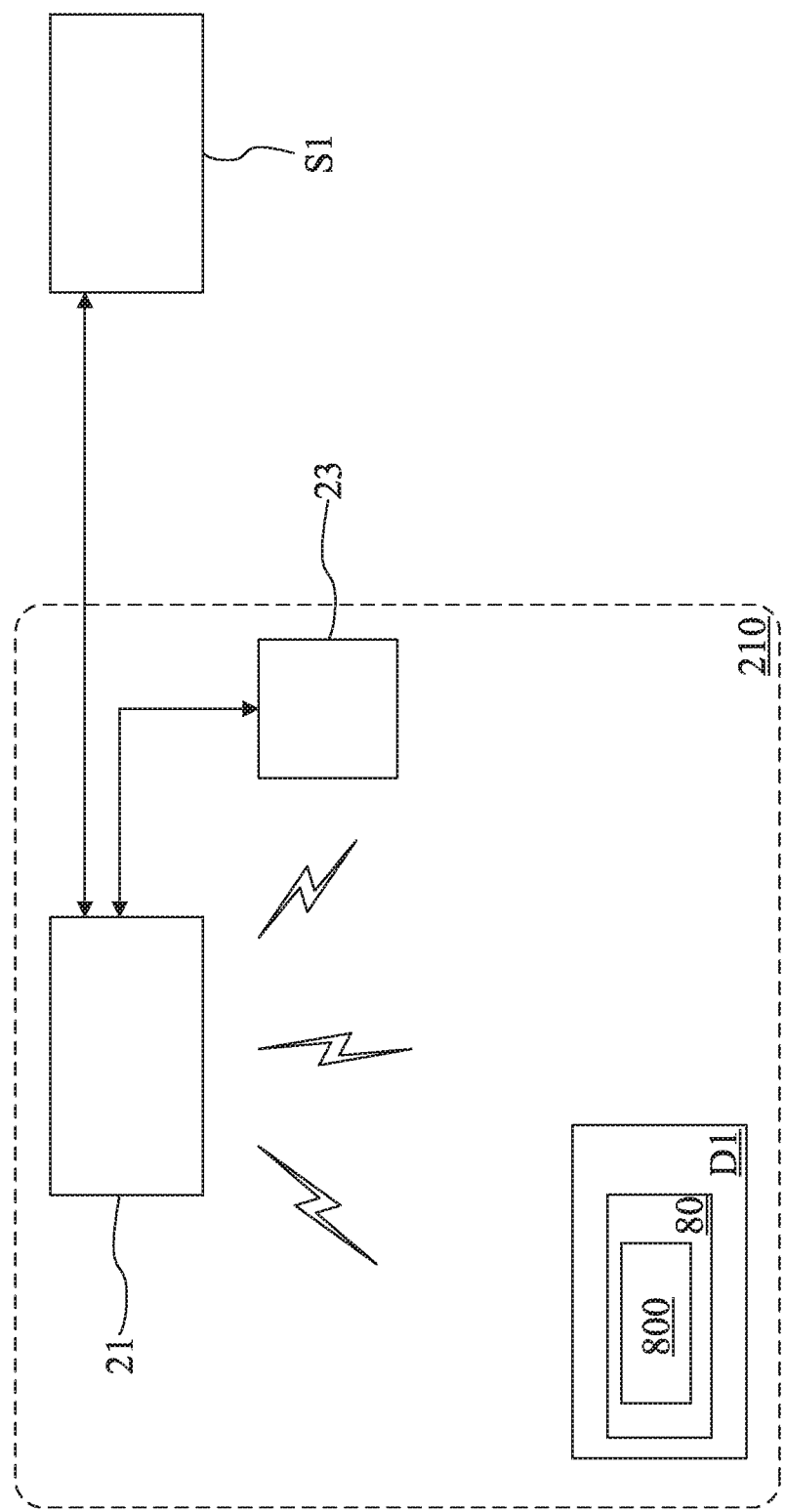
FIG. 2C is a schematic diagram illustrating the disabled identification in accordance with some embodiments.

Please referring to FIG. 2C, which is a schematic diagram illustrating the disabled identification 800 in accordance with some embodiments. In detail, when a user who carries the object 80 with the identification 800 needs to rest for a while, and needs to set the security device 21 as the alarmed mode while the user with the identification 800 is still within the detection coverage 210 of the first I/O module 211, the user may put the object 80 with the identification 800 into a signal shield D1 for shielding the signal transmitted between the first I/O module 211 and the identification 800. Therefore, the first I/O module 211 may not detect the identification 800 within the detection coverage 210 of the first I/O module 211, i.e., the identification 800 is disabled within the detection coverage 210. Accordingly, the processing unit 215 sets the security device 21 as the alarmed mode while the object 80 with the identification 800 is inside the signal shield D1.

On the other hand, when the user wakes up and takes the object 80 with the identification 800 out from the signal shield D1, the signal transmitted between the first I/O module 211 and the identification 800 may be recovered. Therefore, the first I/O module 211 may detect the identification 800 within the detection coverage 210 of the first I/O module 211, i.e., the identification 800 is enabled within the detection coverage 210. Accordingly, the processing unit 215 sets the security device 21 back to the unalarmed mode due to the presence of the identification 800 within the detection coverage 210 of the first I/O module 211.

Figure 2D:
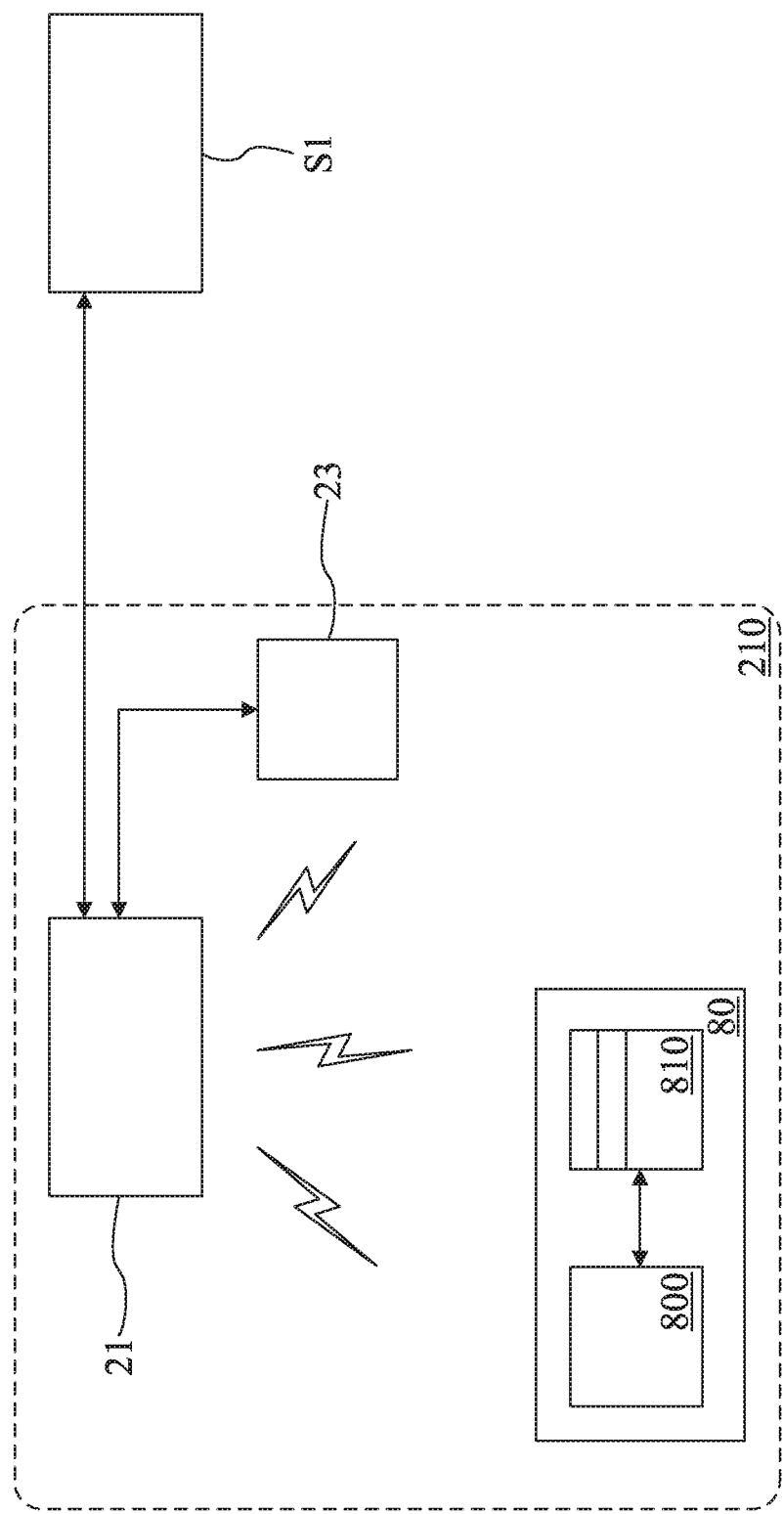
FIG. 2D is a schematic diagram illustrating the disabled identification in accordance with some embodiments.

Please referring to FIG. 2D, which is a schematic diagram illustrating the disabled identification 800 in accordance with some embodiments. The object 80 further includes a switch 810, and the identification 800 may be activated or inactivated by the switch 810. In detail, when a user who carries the object 80 with the identification 800 needs to rest for a while, and needs to set the security device 21 as the alarmed mode while the user with the identification 800 is still within the detection coverage 210 of the first I/O module 211, the user may inactivate the identification 800 by switching off the switch 810. Hence, the signal transmitted between the first I/O module 211 and the identification 800 may be interrupted. Therefore, the first I/O module may not detect the identification 800 within the detection coverage 210 of the first I/O module 211, i.e., the identification 800 is disabled within the detection coverage 210. Accordingly, the processing unit 215 sets the security device 21 as the alarmed mode while the switch 810 is switched off.

On the other hand, when the user wakes up and switches on the switch 810 for activating the identification 800, the signal transmitted between the first I/O module 211 and the identification 800 may be recovered. Therefore, the first I/O module 211 may detect the identification 800 within the detection coverage 210 of the first I/O module 211, i.e., the identification 800 is enabled within the detection coverage 210. Accordingly, the processing unit 215 sets the security device 21 as the unalarmed mode while the switch 810 is switched on.

Figure 2E:
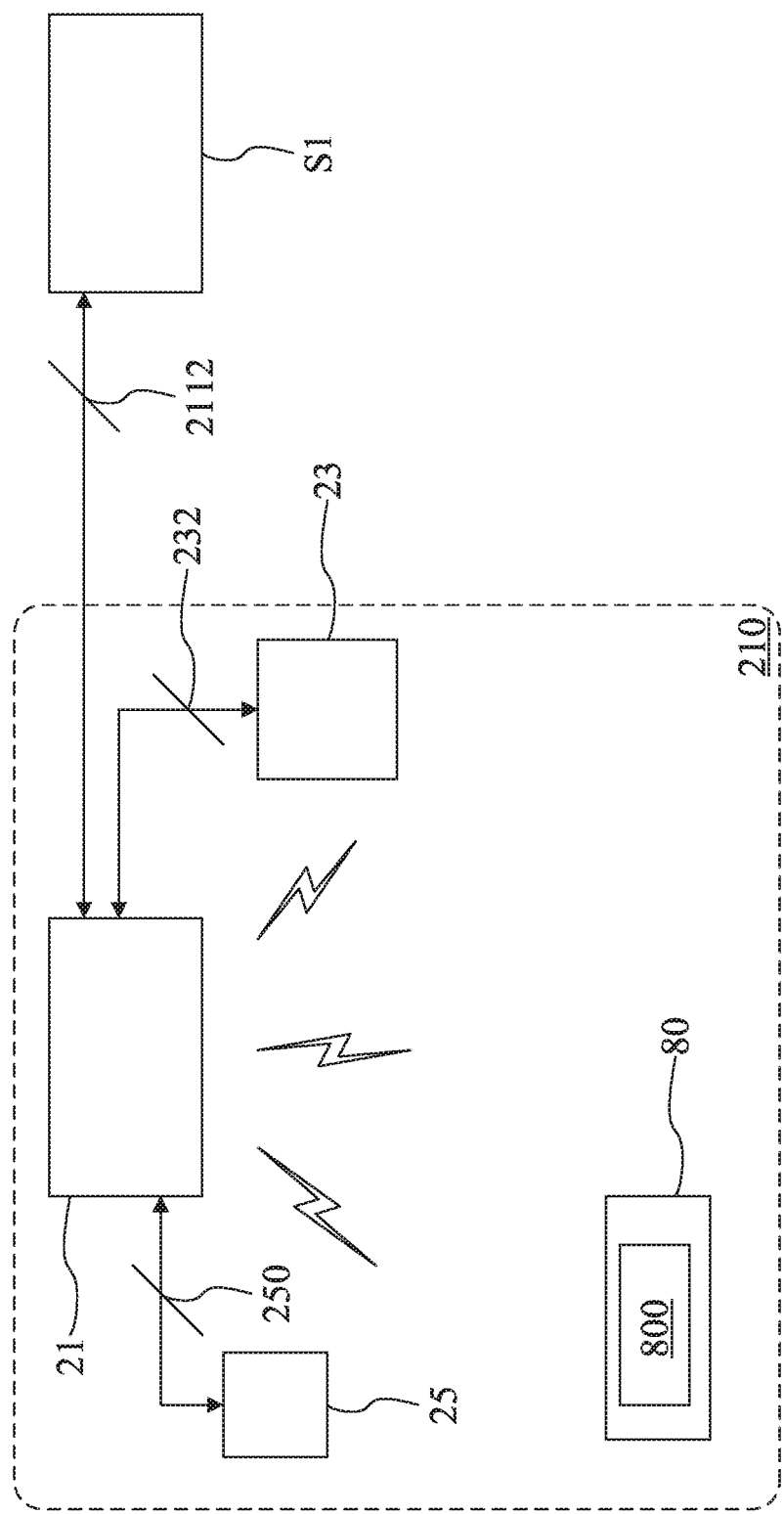
FIG. 2E is a schematic diagram illustrating the applied environment of the security device in accordance with some embodiments of the present disclosure.

Please refer to FIG. 2E, which is a schematic diagram illustrating the applied environment of the security device 21 in accordance with some embodiments of the present disclosure. The security device 21 may further communicate with a light sensor 25 via the first I/O module 211. The light sensor 25 is disposed for sensing light within the detection coverage 210 of the first I/O module 211.

In detail, within the detection coverage 210 of the first I/O module 211, when a light is turned on for lighting the space, the light sensor 25 may detect light and keep transmitting sensing signals 250 to the first I/O module 211 of the security device 21 for reporting the lighting of the space. In some embodiments, when a user who carries the object 80 with the identification 800 needs to rest for a while, the user may turn off the light in the detection coverage 210 while the user with the identification 800 is still within the detection coverage 210 of the first I/O module 211. Then, the light sensor 25 may detect no light and stop transmitting the sensing signals 250 to the first I/O module 211 of the security device 21.

Due to the lack of the sensing signals 250 from the light sensor 25, the processing unit 215 may determine that the light sensor 25 detects no light. Further, when the processing unit 215 determines that the light sensor 25 detects no light in a first period of time (e.g., 5 to 10 minutes), the processing unit 215 forcedly disables the identification 800 within the detection coverage 210 of the first I/O module 211 based on the determination of that the light sensor 25 detects no light in the first period of time. Subsequently, since the identification 800 is disabled within the detection coverage 210 of the first I/O module 211, the processing unit 215 may set the security device 21 as the alarmed mode.

In some embodiments, while the user wakes up and needs to move for turning the light on, the motion sensor 23 may detect the motion of the user within the detection coverage 210 under the alarmed mode. Therefore, the motion sensor 23 may transmit a sensing signal 232 to the first I/O module 211 of the security device 21. It should be noted that, within a second period of time (e.g., 1 to 3 minutes), if the processing unit 215 has not received any sensing signal 250 from the light sensor 25, i.e., the light has not been turned on, the security device 21 may still be under the alarmed mode and the detected motion may be caused illegally.

Accordingly, after the second period of time, the processing unit 215 may transmit an alarmed signal 2112 to the server S1 by the second I/O module 213 for informing the server S1 of potential risk.

On the other hand, within the second period of time, if the processing unit 215 has received the sensing signals 250 from the light sensor 25, i.e., the light has been turned on, the processing unit 215 may enable the identification 800 within the detection coverage 210 of the first I/O module 211 based on the sensing signals 250 from the light sensor 25. Subsequently, since the identification 800 is enabled within the detection coverage 210 of the first I/O module 211, the processing unit 215 may set the security device 21 as the unalarmed mode.

Figure 2F:
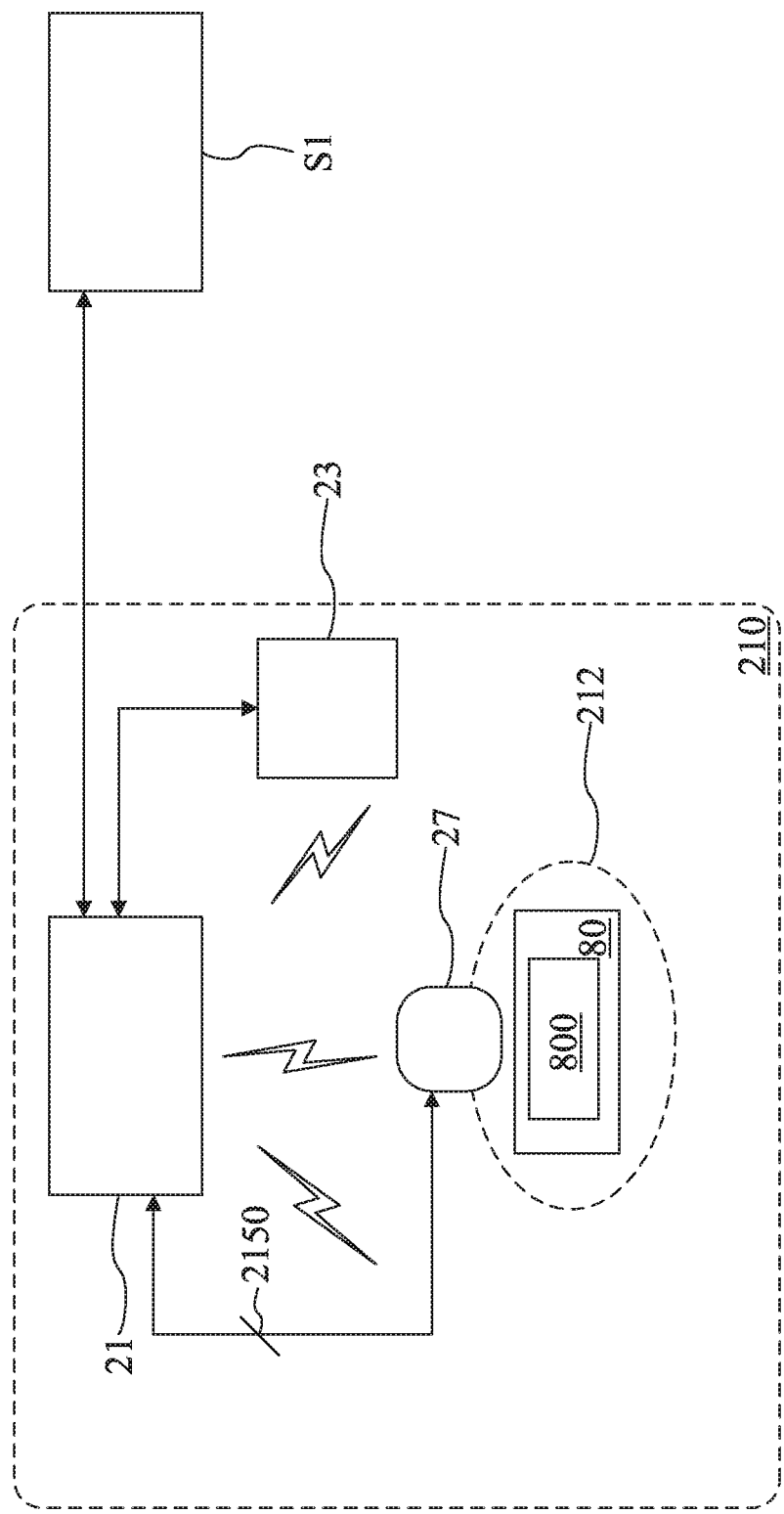
FIG. 2F is a schematic diagram illustrating the applied environment of the security device in accordance with some embodiments of the present disclosure.

Please refer to FIG. 2F, which is a schematic diagram illustrating the applied environment of the security device 21 in accordance with some embodiments of the present disclosure. In these embodiments, some reminders may be configured for reminding the user who carries the object 80 with the identification 800 at some locations or at some times within the detection coverage 210.

In detail, a reminder, which is used for reminding the user to perform action 'A' while the user is at a position 212 during a period 'T1' of time, may be preconfigured in the security device 21. Accordingly, when the first I/O module 211 detects the identification 800 at the position 212 within the detection coverage 210 during the period 'T1' of time, the processing unit 215 may transmit a notifying signal 2150 to a speaker 27 for playing sound based on the notifying signal 2150 for remaindering the user to perform action 'A'.

For example, a reminder is preconfigured for reminding the user to perform an action 'take medicine' while the user is at a position of 'bed' during a period '21:00~23:00' of time. Accordingly, when the first I/O module 211 detects the user who carries the object 80 with identification 800 at the position of 'bed' within the detection coverage 210 during the period '21:00~23:00' of time, the processing unit 215 may transmit the notifying signal 2150 to the speaker 27 for playing sound based on the notifying signal 2150 for remaindering the user to perform the action 'take medicine'.

In some embodiments, the speak 27 may be disposed: (1) at the position 212; (2) in the security device 21; or (3) in the object 80 (e.g., a mobile device). In some embodiments, the first I/O module 211 may communicate with a plurality of sensors or detectors, which are disposed within the detection coverage 210, for locating the position of the identification 800. However, it is not intended to limit the hardware implementation embodiments of the present disclosure.

Figure 2G:
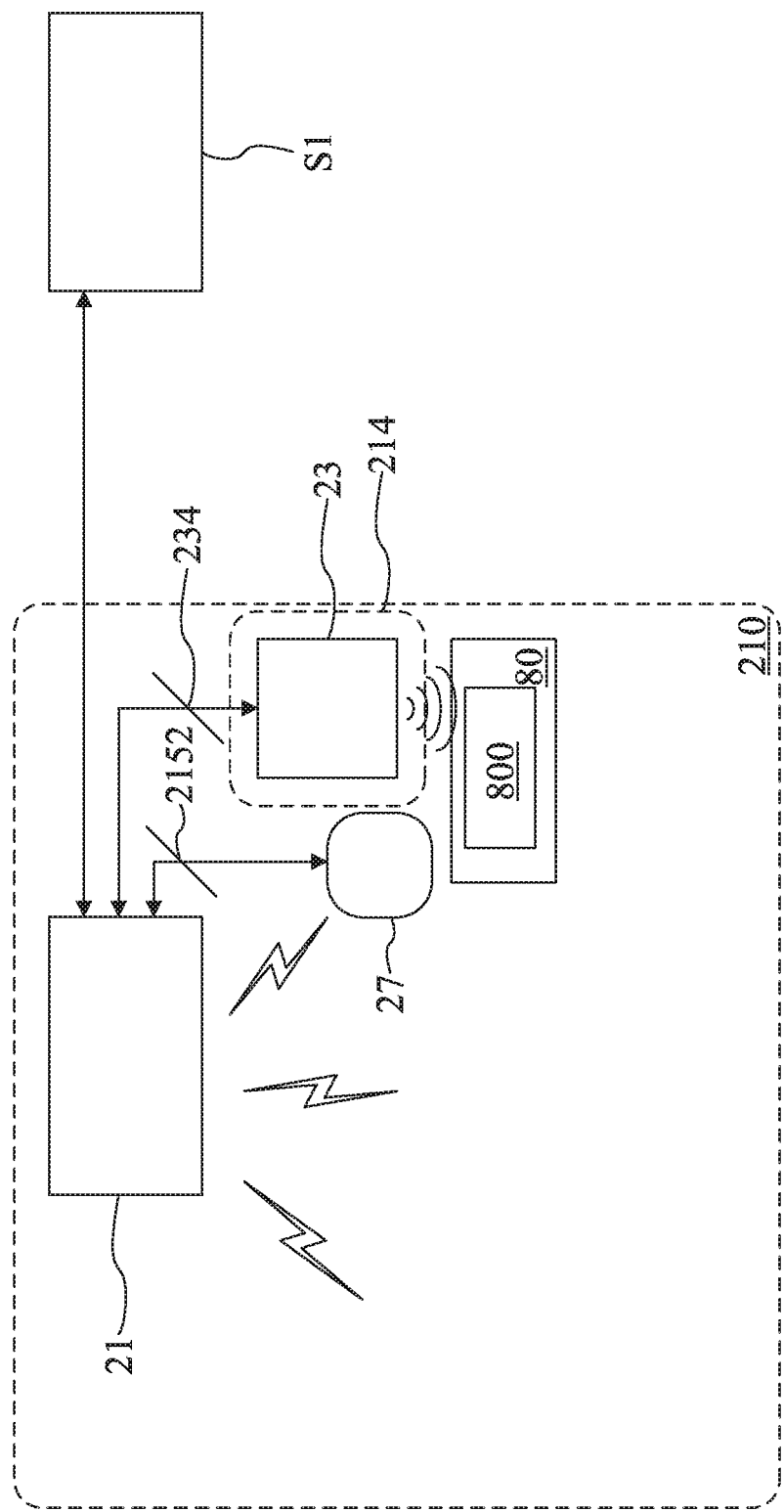
FIG. 2G is a schematic diagram illustrating the applied environment of the security device in accordance with some embodiments of the present disclosure.

Please refer to FIG. 2G, which is a schematic diagram illustrating the applied environment of the security device 21 in accordance with some embodiments of the present disclosure. In these embodiments, some reminders may be configured for reminding the user who carries the object 80 with the identification 800 at some locations or at some times within the detection coverage 210.

In detail, a reminder, which is used for reminding the user to perform action 'B' while the user is at a position 214 during a period 'T2' of time, may be preconfigured in the security device 21. In these embodiments, the motion sensor 23 may be disposed at the position 214. Accordingly, when the user who carries the object 80 with the identification 800 moves toward the position 214, the motion sensor 23 may detect the user and transmit a sensing signal 234 to the first I/O module 211. In other words, the first I/O module 211 receives the sensing signal 234 from the motion sensor 23 disposed at the position 214.

Next, the processing unit 215 determines whether the sensing signal 234 is received during the period 'T2' of time. When the sensing signal 234 is not received during the period 'T2' of time, the sensing signal 234 may be ignored. When the sensing signal 234 is received during the period T2' of time, the processing unit 215 may transmit a notifying signal 2152 to the speaker 27 for playing sound based on the notifying signal 2152 for remaindering the user to perform action 'B'.

For example, the motion sensor 23 is disposed at the 'front door' and a reminder is preconfigured for reminding the user to perform an action 'bring the wallet' during a period '08:00~10:00' of time. Accordingly, when the user who carries the object 80 with the identification 800 moves toward the 'front door', the motion sensor 23 may detect the user and transmit the sensing signal 234 to the first I/O module 211. In other words, the first I/O module 211 receives the sensing signal 234 from the motion sensor 23 disposed at the 'front door'.

Next, the processing unit 215 determines whether the sensing signal 234 is received during the period '08:00~10:00' of time. When the sensing signal 234 is not received during the period '08:00~10:00' of time, the sensing signal 234 may be ignored. When the sensing signal 234 is received during the period '08:00~10:00' of time, the processing unit 215 may transmit the notifying signal 2152 to the speaker 27 for playing sound based on the notifying signal 2152 for remaindering the user to perform action 'bring the wallet'.

Figure 2H:
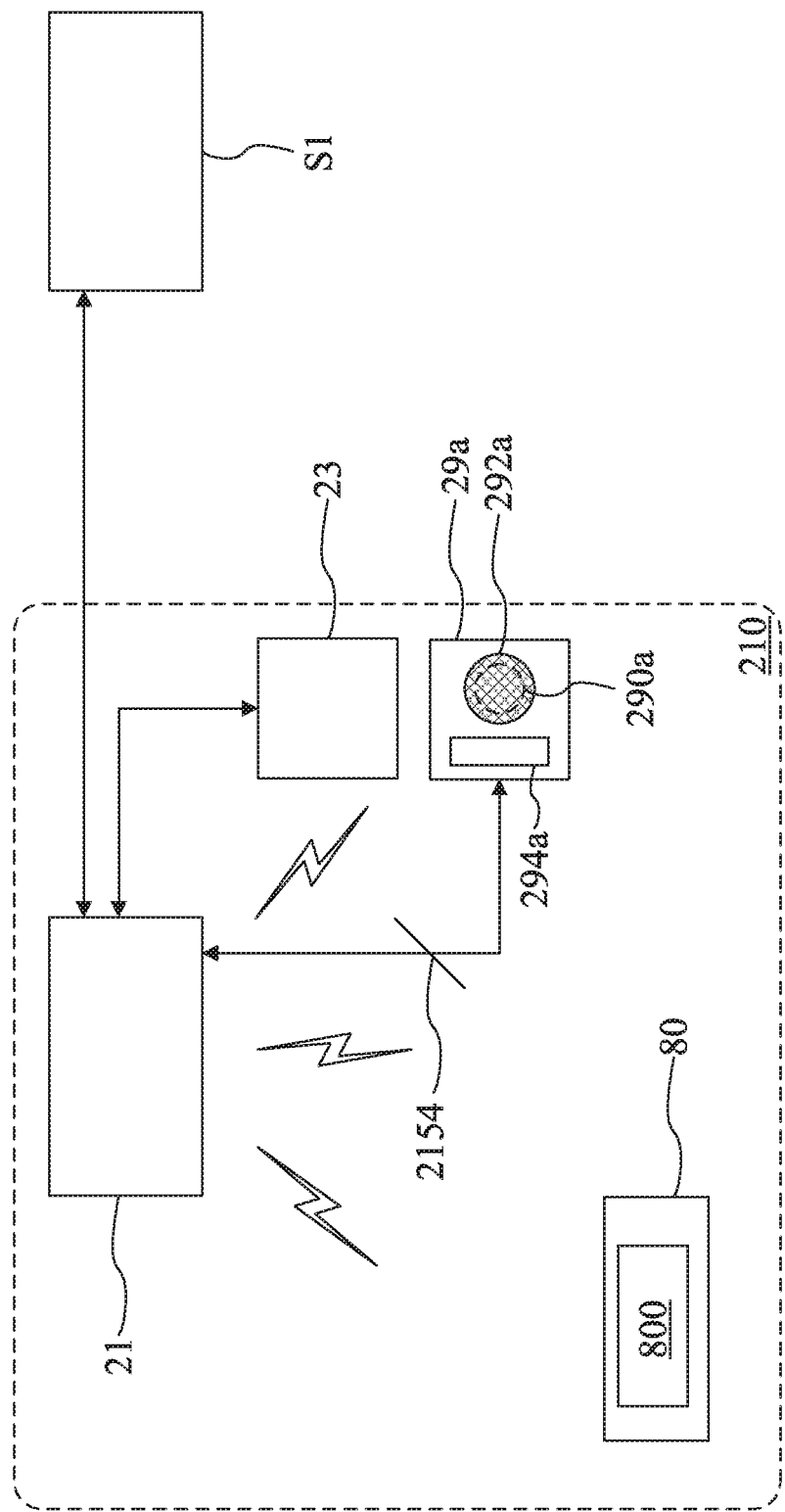
FIG. 2H is a schematic diagram illustrating the applied environment of the security device in accordance with some embodiments of the present disclosure.

Please refer to FIG. 2H, which is a schematic diagram illustrating the applied environment of the security device 21 in accordance with some embodiments of the present disclosure. The security device 21 may further communicate with a camera module 29a via the first I/O module 211. The camera module 29a is disposed for monitoring the environment. It should be noted that the camera module 29a is activated while the security device 21 is set as alarmed mode. On the other hand, when the user who carries the object 80 with the identification 800 is within the detection coverage 210 and the security device 21 is set as unalarmed mode, the camera module 29a is inactivated for protecting the privacy of the user.

In some embodiments, the camera module 29a is inactivated by physical mechanism. In detail, the camera module 29a includes a lens 290a, a physical mask 292a and a controller 294a. The security device 21 communicates with the camera module 29a via the first I/O module 211 and the controller 294a. When the identification 800 is enabled within the detection 210 coverage of the first I/O module 211, the processing unit 215 sets the security device 21 as the unalarmed mode and transmits a control signal 2154 to the camera module 29a by the first I/O module 211.

After receiving the control signal 2154, the controller 294a of the camera module 29a activates the physical mask 292a for covering the lens 290a of the camera 29a. Accordingly, the camera module 29a is substantially inactivated since the recording of the environment is failed due to the activation of the physical mask 292a.

Figure 2I:
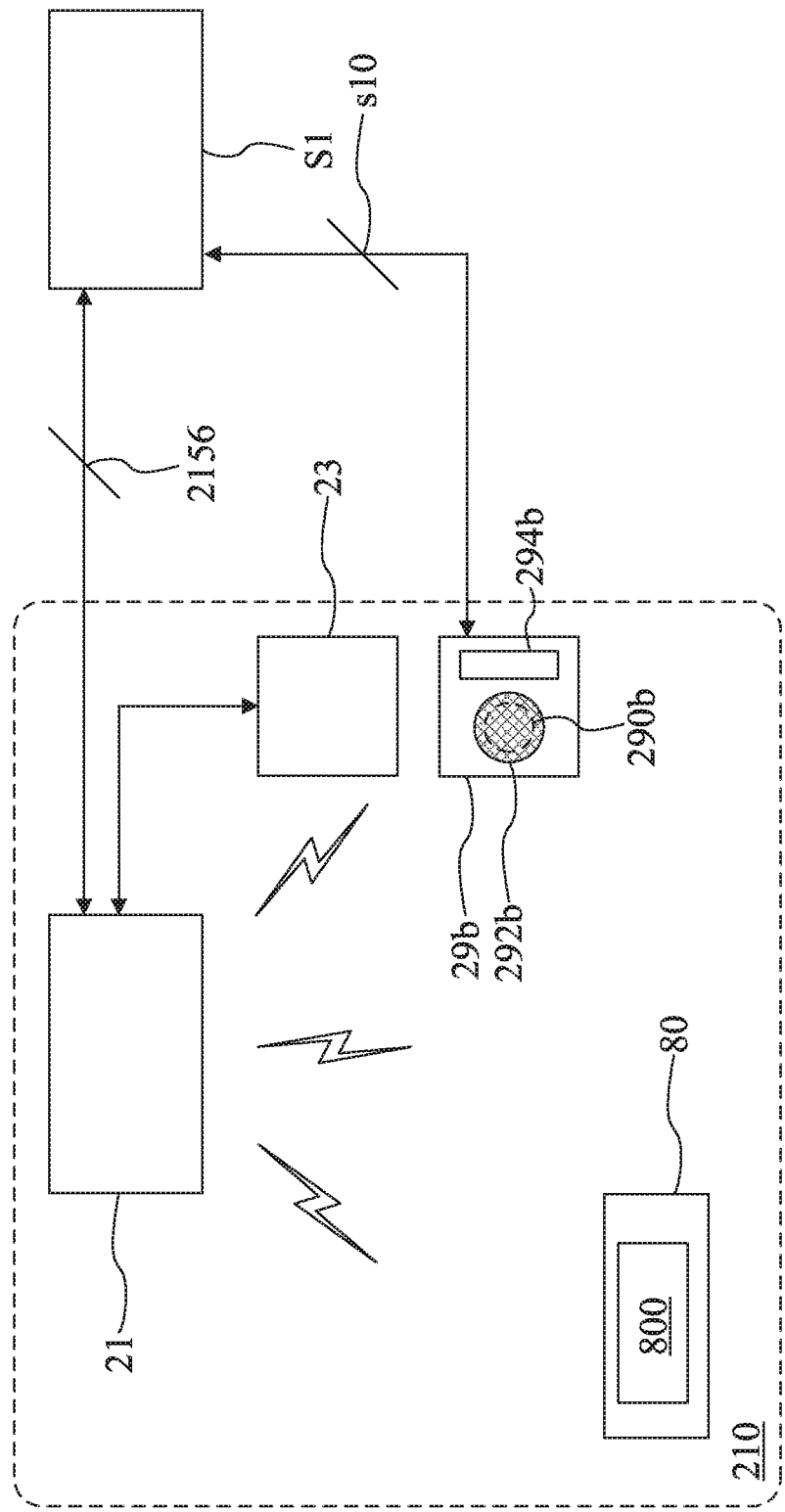
FIG. 2I is a schematic diagram illustrating the applied environment of the security device in accordance with some embodiments of the present disclosure.

Please refer to FIG. 2I, which is a schematic diagram illustrating the applied environment of the security device 21 in accordance with some embodiments of the present disclosure. In these embodiments, the security device 21 communicates with the server S1 via the second I/O module 213, and the server S1 connects with a camera module 29b. Therefore, the security device 21 may further communicate with the camera module 29b via the server S1. Similarly, the camera module 29b is disposed for monitoring the environment.

It should be noted that the camera module 29b is activated while the security device 21 is set as alarmed mode. On the other hand, when the user who carries the object 80 with the identification 800 is within the detection coverage 210 and the security device 21 is set as unalarmed mode, the camera module 29b is inactivated for protecting the privacy of the user.

In some embodiments, the camera module 29b is inactivated by physical mechanism. In detail, the camera module 29b includes a lens 290b, a physical mask 292b and a controller 294b. When the identification 800 is enabled within the detection 210 coverage of the first I/O module 211, the processing unit 215 sets the security device 21 as the unalarmed mode and transmits a control signal 215b to the server S1 by the second I/O module 213.

After receiving the control signal 215b, the server S1 transmits a control signal s10 to the controller 294b of the camera module 29b for the controller 294b to activate the physical mask 292b for covering the lens 290b of the camera 29b. Accordingly, the camera module 29b is substantially inactivated since the recording of the environment is failed due to the activation of the physical mask 292b.

Figure 2J:
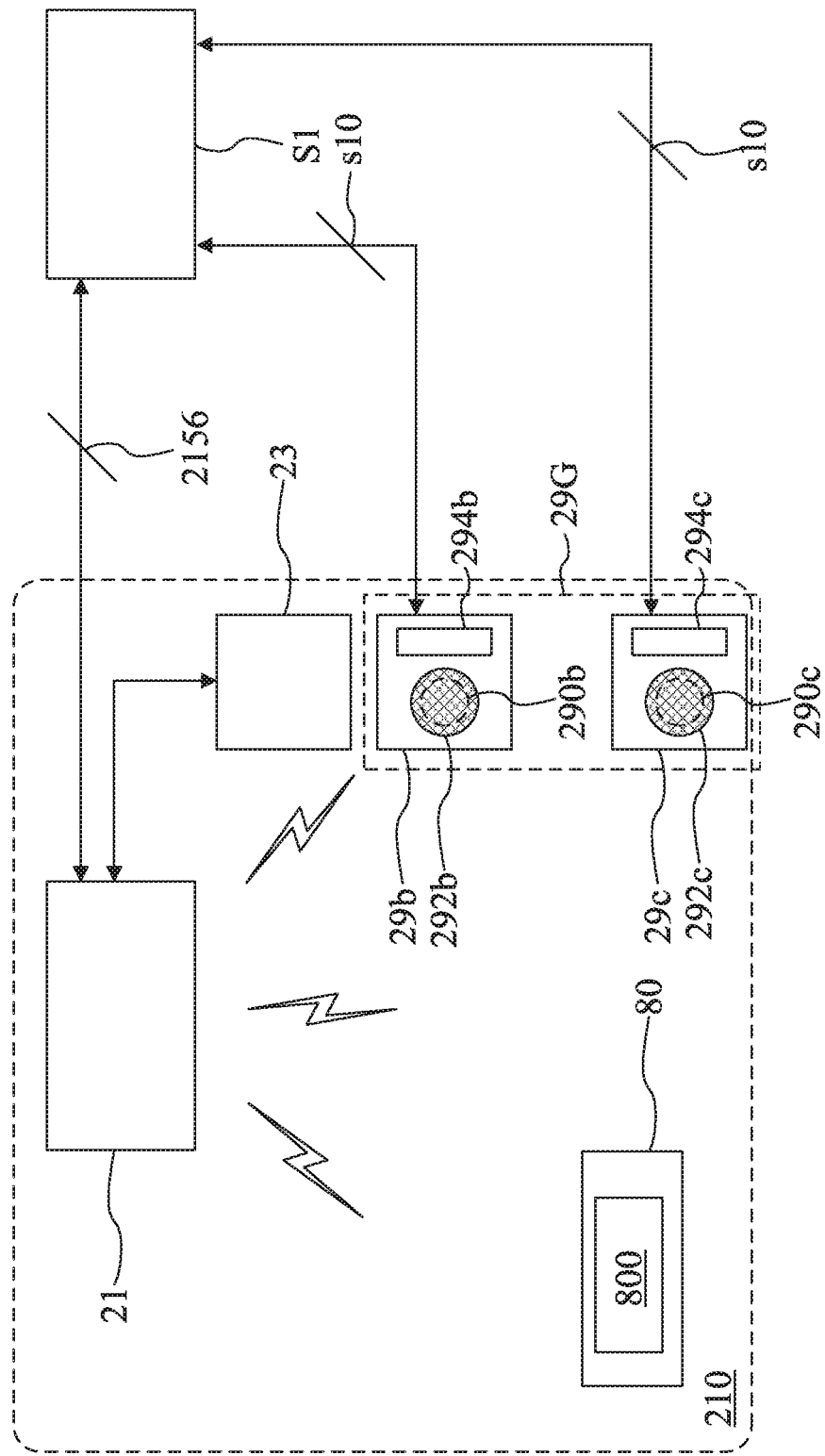
FIG. 2J is a schematic diagram illustrating the applied environment of the security device in accordance with some embodiments of the present disclosure.

Please refer to FIG. 2J, which is a schematic diagram illustrating the applied environment of the security device 21 in accordance with some embodiments of the present disclosure. The server S1 connects with a camera group 29G while the camera 29G includes the camera module 29b and a camera module 29c at least. The camera module 29c includes a lens 290c, a physical mask 292c and a controller 294c.

In these embodiments, when the processing unit 215 transmits the control signal 215b to the server S1 for inactivating the camera module 29b, the server S1 inactivates all the camera modules of the camera group 29G related to the camera module 29b. In detail, after receiving the control signal 215b, the server S1 transmits the control signal s10 to the camera modules, which are the camera modules 29b and 29c, of the camera group 29G. Accordingly, the controllers 294b and 294c of the camera modules 29b and 29c activate the physical mask 292b and 292c for covering the lens 290b and 290c based on the control signal s10 respectively. Therefore, the camera module 29b and 29c are substantially inactivated since the recordings of the environment are failed due to the activations of the physical masks 292b and 292c.

Figure 3A:
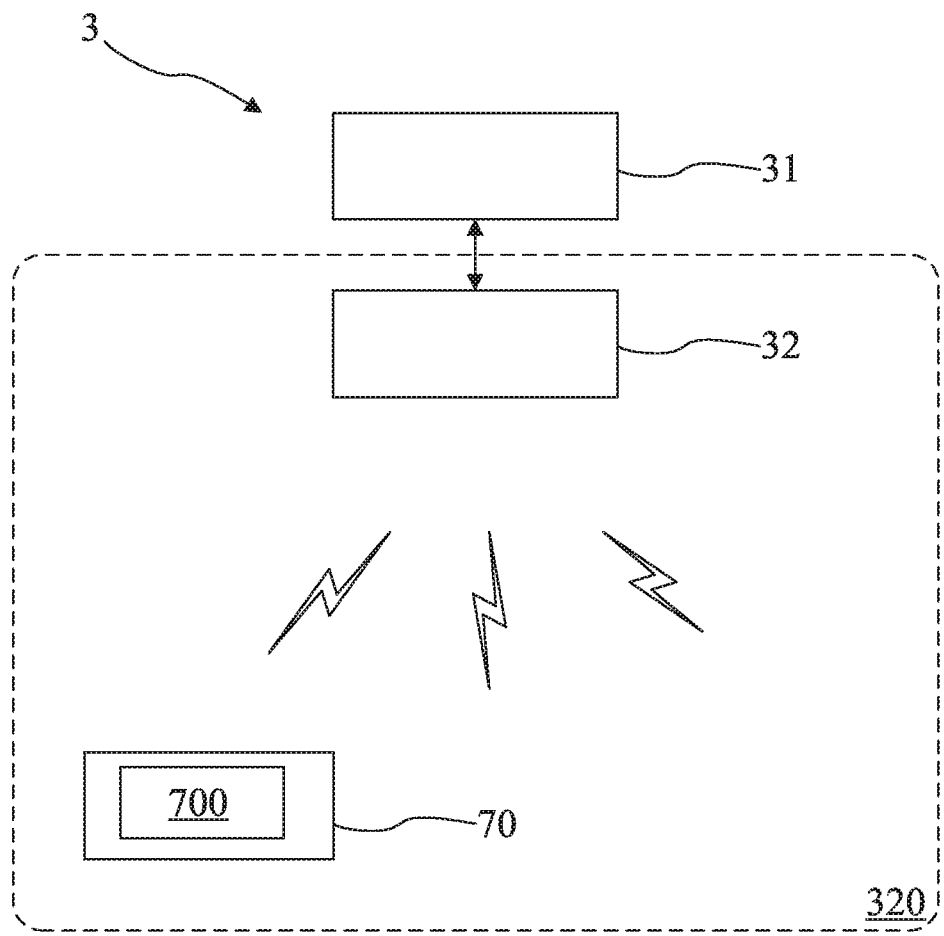
FIG. 3A is a schematic diagram illustrating the applied environment of the security system in accordance with some embodiments of the present disclosure.
Figure 3B:
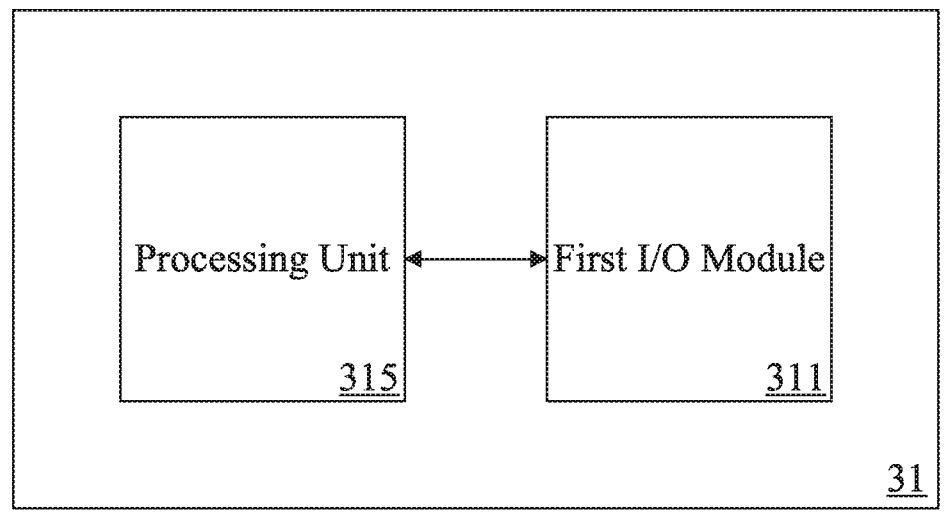
FIG. 3B is a block diagram of the security device in accordance with some embodiments of the present disclosure.

Please refer to FIG. 3A and FIG. 3B together. FIG. 3A is a schematic diagram illustrating the applied environment of a security system 3 in accordance with some embodiments of the present disclosure. The security system 3 includes a security device 31 and a detection module 32. FIG. 3B is a block diagram of the security device 31 in accordance with some embodiments of the present disclosure. The security device 31 includes a first I/O module 311 and a processing unit 315. The first I/O module 311 communicates with the detection module 32. The processing unit 315 is electrically coupled to the first I/O module 311. The detection module 32 may be installed or mounted at a location of interest in an area to be protected. Interactions among these elements will be further described hereinafter.

Referring to FIG. 3A, when an object 70 with an identification 700 enters a detection coverage 320 of the detection module 32, the detection module 32 detects the identification 700 within the detection coverage 320 and informs the security device 31 of the detection. Then, the processing unit 315 determines whether the identification 700 is registered with the security device 31. In some embodiments, when the identification 700 is registered with the security device 31, it means that the identification 700 may be legal for the security device 31. Accordingly, based on the presence of the legal identification 700 within the detection coverage 320, the processing unit 315 sets the security device 31 as an unalarmed mode (not shown).

In some embodiments, the identification 700 may be enabled or disabled within the detection coverage 320 of the detection module 32. In detail, when the identification 700 is enabled within the detection coverage 320 of the detection module 32, the processing unit 315 sets the security device 31 as the unalarmed mode. On the other hand, when the identification 700 is disabled within the detection coverage 320 of the detection module 32, the processing unit 315 sets the security device 31 as an alarmed mode (not shown) since the identification 700, which may cause the security device 31 to be set as the unalarmed mode, is considered to be absent within the detection coverage 320 due to the disabled state.

In some embodiments, the object 70 with the identification 700 may be implemented as a remote identification carrier (e.g., device with Bluetooth tag, device with Near-field Communication tag etc.), and the security system 3 communicatively coupled with the remote identification carrier. Further, the detection module 32 may be implemented as a sensor for monitoring trespassing into a specific field (i.e., the detection coverage 320). The security device 31, which acts as a control unit, may receive an indicating signal from the remote identification carrier to determine to activate or inactivate the sensor while the remote identification carrier is within the specific filed.

Figure 4A:
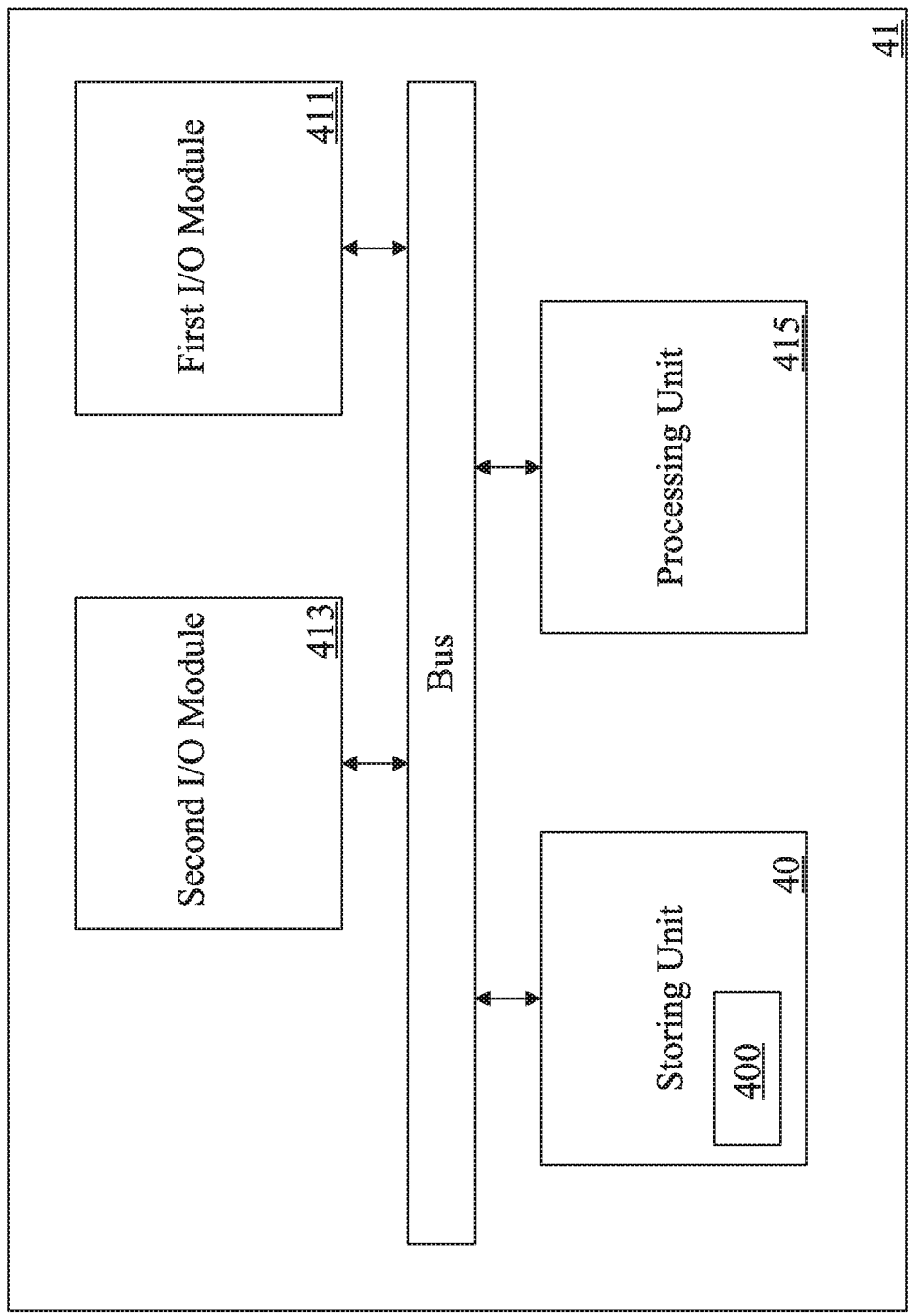
FIG. 4A is a schematic diagram illustrating the applied environment of the security system in accordance with some embodiments of the present disclosure.
Figure 4B:
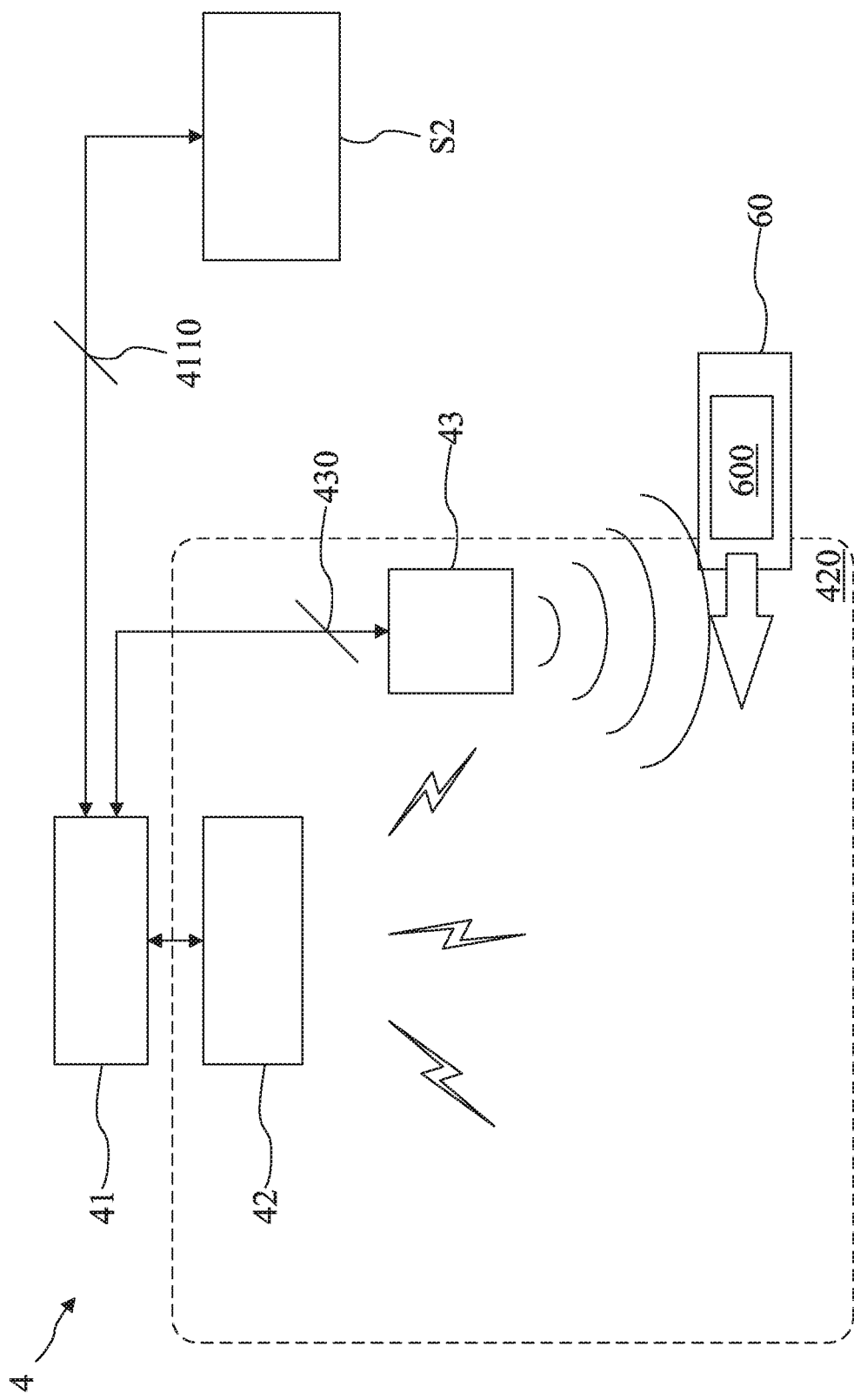
FIG. 4B is a block diagram of the security device in accordance with some embodiments of the present disclosure.

Please refer to FIG. 4A and FIG. 4B together. FIG. 4A is a schematic diagram illustrating the applied environment of a security s1 system 4 in accordance with some embodiments of the present disclosure. The security system 4 includes a storing unit 40, a security device 41, a detection module 42, a motion sensor 43 and a server S2. The storing unit 40 stores a list 400 which recorded identifications of legal devices. In these embodiments, the storing unit 40 may be disposed on the security device 41 and electrically coupled with the elements of the security device 41. In some embodiments, the storing unit 40 may be disposed on the detection module 42 and interact with the security device 41 communicatively.

FIG. 4B is a block diagram of the security device 41 in accordance with some embodiments of the present disclosure. The security device 41 includes a first I/O module 411, a second I/O module 413 and a processing unit 415. The first I/O module 411, the second I/O module 413 and the processing unit 415 are electrically coupled (e.g., electrically coupled via bus). The security device 41 communicates with the detection module 42 and the motion sensor 45 via the first I/O module 411. The security device 41 communicates with the server S2 via the second I/O module 413. The detection module 42 may be installed or mounted at a location of interest in an area to be protected. The motion sensor 43 is disposed for sensing objects which enter a detection coverage 420 of the detection module 42. Interactions among these elements will be further described hereinafter.

Referring to FIG. 4B, when an object 60 enters the detection coverage 420 of the detection module 42, the motion sensor 43 senses the presence of the object 60, and then transmits a sensing signal 430 to the first I/O module 411 of the security device 41. Then, based on the sensing signal 430, the processing unit 415 informs the detection module 42 of detecting whether the object 60 has any identification within the detection coverage 420.

In some embodiments, when the detection module 42 detects no identification based on the presence of the object 60 and the security device 41 is set as an alarmed mode, the processing unit 411 transmits an alarmed signal 4110 to the server S2 via the second I/O module 413 for informing the server S2 of potential risk. On the other hand, when the detection module 42 detects an identification 600 based on the presence of the object 60, the processing unit 415 determines whether the identification 600 is registered in the list 400.

In some embodiments, when the identification 600 is not registered in the list 400 and the security device 41 is set as an alarmed mode, the processing unit 415 transmits the alarmed signal 4110 to the server S2 via the second I/O module 413 for informing the server S2 of potential risk. On the other hand, when the identification 600 is registered in the list 400, it means that the identification 600 may be legal for the security device 41. Accordingly, based on the presence of the legal identification 600 within the detection coverage 420, the processing unit 415 sets the security device 41 as an unalarmed mode.

In some embodiments, the identification 600 may be enabled or disabled within the detection coverage 420 of the detection module 42. In detail, when the identification 600 is enabled within the detection coverage 420 of the detection module 42, the processing unit 415 sets the security device 41 as the unalarmed mode. On the other hand, when the identification 600 is disabled within the detection coverage 420 of the detection module 42, the processing unit 415 sets the security device 41 as the alarmed mode since the identification 600, which may cause the security device 41 to be set as the unalarmed mode, is considered to be absent within the detection coverage 420 due to the disabled state.

Figure 4C:
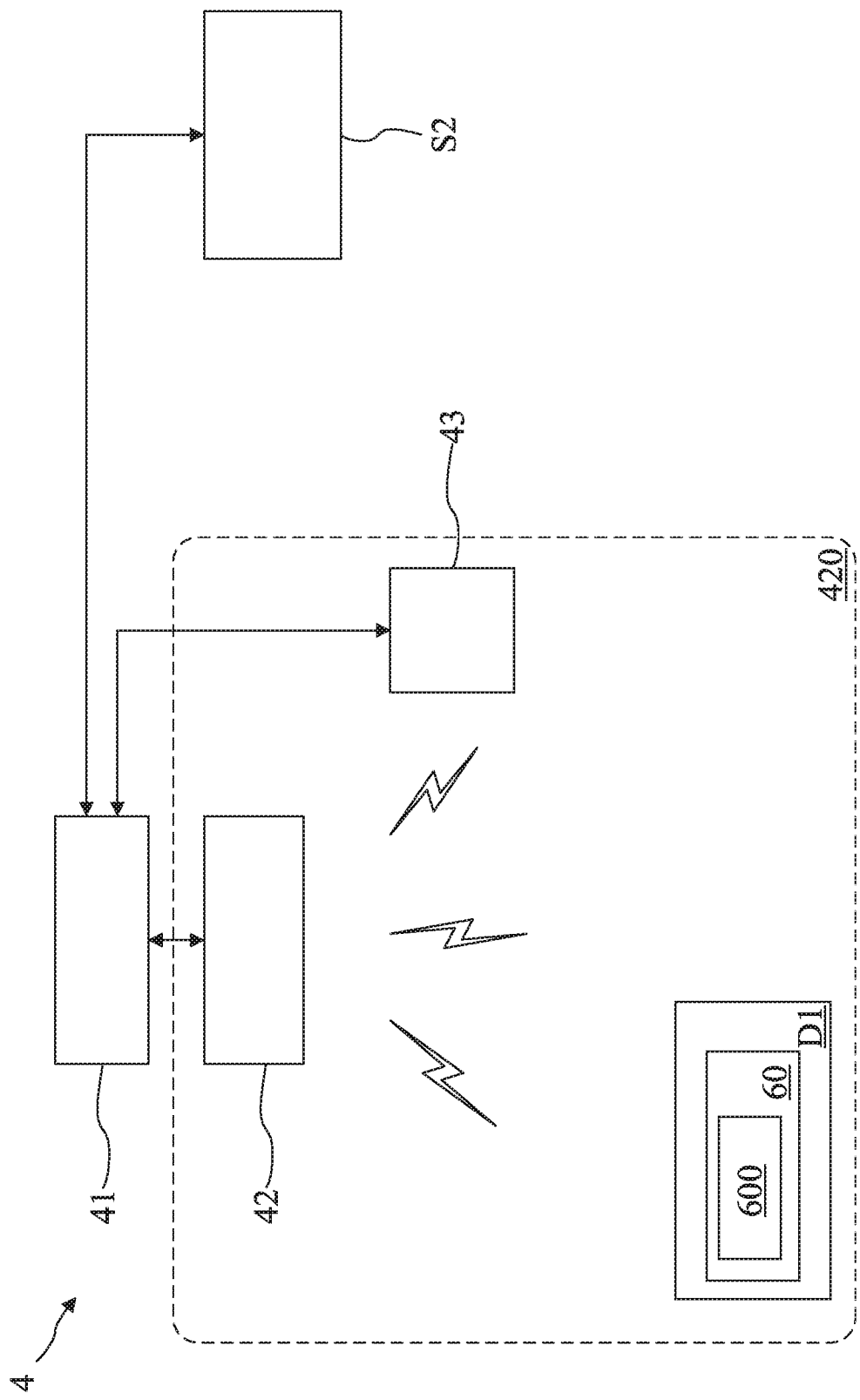
FIG. 4C is a schematic diagram illustrating the disabled identification in accordance with some embodiments.

Please referring to FIG. 4C, which is a schematic diagram illustrating the disabled identification 600 in accordance with some embodiments. The security system 4 further includes a signal shield D2. In detail, when a user who carries the object 60 with the identification 600 needs to rest for a while, and needs to set the security device 41 as the alarmed mode while the user with the identification 600 is still within the detection coverage 420 of the detection module 42, the user may put the object 60 with the identification 600 into the signal shield D2 for shielding the signal transmitted between the detection module 42 and the identification 600. Therefore, the detection module 42 may not detect the identification 600 within the detection coverage 420 of the detection module 42, i.e., the identification 600 is disabled within the detection coverage 420. Accordingly, the processing unit 415 sets the security device 41 as the alarmed mode while the object 60 with the identification 600 is inside the signal shield D2.

On the other hand, when the user wakes up and takes the object 60 with the identification 600 out from the signal shield D2, the signal transmitted between the detection module 42 and the identification 600 may be recovered. Therefore, the detection module 42 may detect the identification 600 within the detection coverage 420 of the detection module 42, i.e., the identification 600 is enabled within the detection coverage 420. Accordingly, the processing unit 415 sets the security device 41 back to the unalarmed mode due to the presence of the identification 600 within the detection coverage 420 of the detection module 42.

Figure 4D:
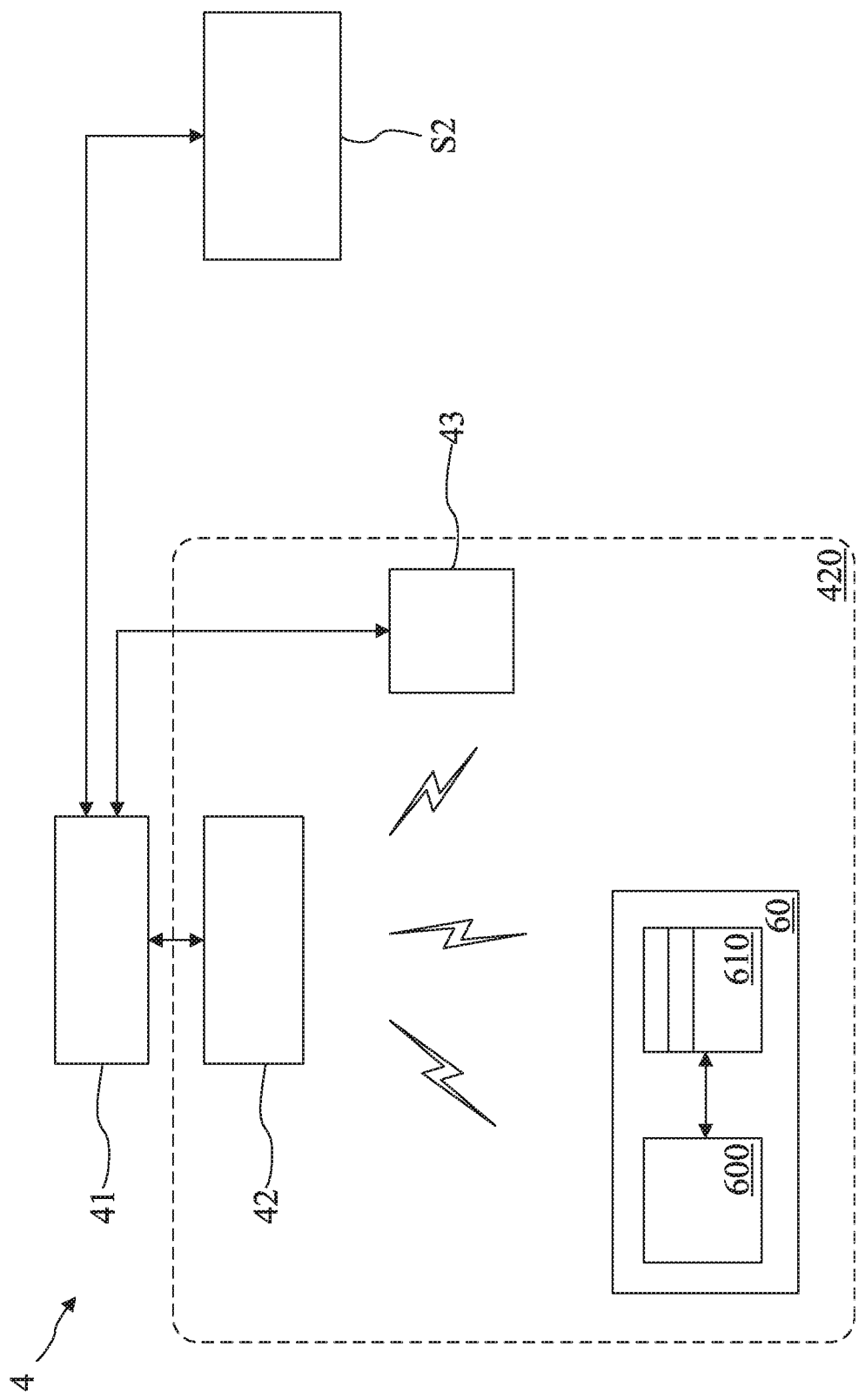
FIG. 4D is a schematic diagram illustrating the disabled identification in accordance with some embodiments.

Please referring to FIG. 4D, which is a schematic diagram illustrating the disabled identification 600 in accordance with some embodiments. The object 60 is an apparatus included in the security system 4. The apparatus includes a switch 610, and the identification 600 may be activated or inactivated by the switch 610. In detail, when a user who carries the object 60 with the identification 600 needs to rest for a while, and needs to set the security device 41 as the alarmed mode while the user with the identification 600 is still within the detection coverage 420 of the detection module 42, the user may inactivate the identification 600 by switching off the switch 610 for interrupting the signal transmitted between the detection module 42 and the identification 600. Therefore, the detection module 42 may not detect the identification 600 within the detection coverage 420 of the detection module 42, i.e., the identification 600 is disabled within the detection coverage 420. Accordingly, the processing unit 415 sets the security device 41 as the alarmed mode while the switch 610 is switched off.

On the other hand, when the user wakes up and switches on the switch 610 for activating the identification 600, the signal transmitted between the detection module 42 and the identification 600 may be recovered. Therefore, the detection module 42 may detect the identification 600 within the detection coverage 420 of the detection module 42, i.e., the identification 600 is enabled within the detection coverage 420. Accordingly, the processing unit 415 sets the security device 41 as the unalarmed mode while the switch 610 is switched on.

Figure 4E:
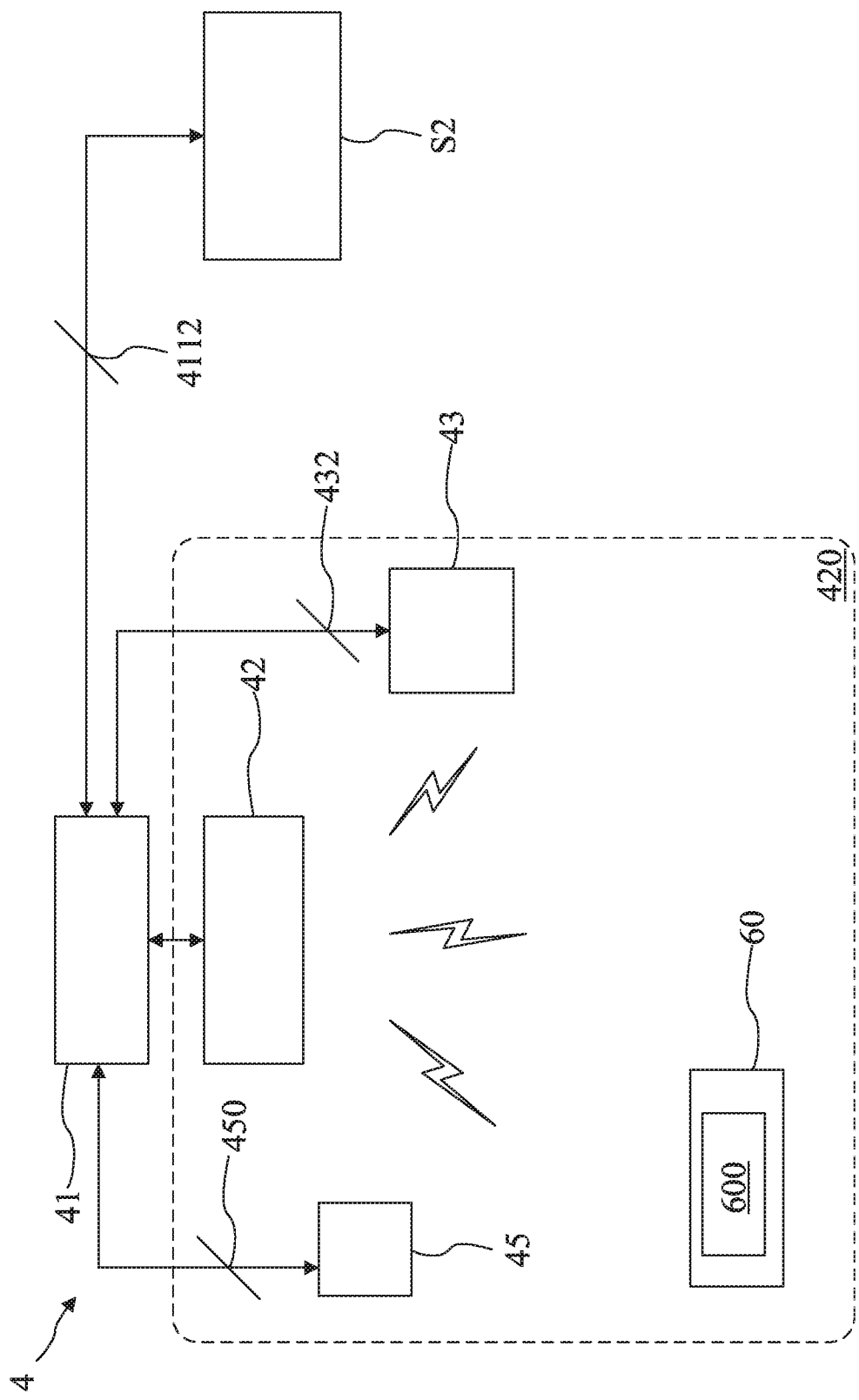
FIG. 4E is a schematic diagram illustrating the applied environment of the security system in accordance with some embodiments of the present disclosure.

Please refer to FIG. 4E, which is a schematic diagram illustrating the applied environment of the security system 4 in accordance with some embodiments of the present disclosure. The security system further includes a light sensor 45. The security device 41 further communicates with the light sensor 45 via the first I/O module 411. The light sensor 45 is disposed for sensing light within the detection coverage 420 of the detection module 42.

In detail, within the detection coverage 420 of the detection module 42, when a light is turned on for lighting the space, the light sensor 45 may detect light and keep transmitting sensing signals 450 to the first I/O module 411 of the security device 41 for reporting the lighting of the space. In some embodiments, when a user who carries the object 60 with the identification 600 needs to rest for a while, the user may turn off the light in the detection coverage 420 while the user with the identification 600 is still within the detection coverage 420 of the detection module 42. Then, the light sensor 45 may detect no light and stop transmitting the sensing signals 450 to the first I/O module 411 of the security device 41.

Therefore, due to the lack of the sensing signals 450 from the light sensor 45, the processing unit 415 may determine that the light sensor 45 detects no light. Further, when the processing unit 415 determines that the light sensor 45 detects no light in a first period of time (e.g., 5 to 10 minutes), the processing unit 415 forcedly disables the identification 600 within the detection coverage 420 of the detection module 42 based on the determination of that the light sensor 45 detects no light in the first period of time. Subsequently, since the identification 600 is disabled within the detection coverage 420 of the detection module 42, the processing unit 415 may set the security device 41 as the alarmed mode.

In some embodiments, while the user wakes up and needs to move for turning the light on, the motion sensor 43 may detect the motion of the user within the detection coverage 420 under the alarmed mode. Therefore, the motion sensor 43 may transmit a sensing signal 432 to the first I/O module 411 of the security device 41. It should be noted that, within a second period of time (e.g., 1 to 3 minutes), if the processing unit 415 has not received any sensing signal 450 from the light sensor 45, i.e., the light has not been turned on, the security device 41 may still be under the alarmed mode and the detected motion may be caused illegally. Accordingly, after the second period of time, the processing unit 415 may transmit an alarmed signal 4112 to the server S2 by the second I/O module 413 for informing the server S2 of potential risk.

On the other hand, within the second period of time, if the processing unit 415 has received the sensing signals 450 from the light sensor 45, i.e., the light has been turned on, the processing unit 415 may enable the identification 600 within the detection coverage 420 of the detection 42 based on the sensing signals 450 from the light sensor 45. Subsequently, since the identification 600 is enabled within the detection coverage 420 of the detection module 42, the processing unit 415 may set the security device 41 as the unalarmed mode.

Figure 4F:
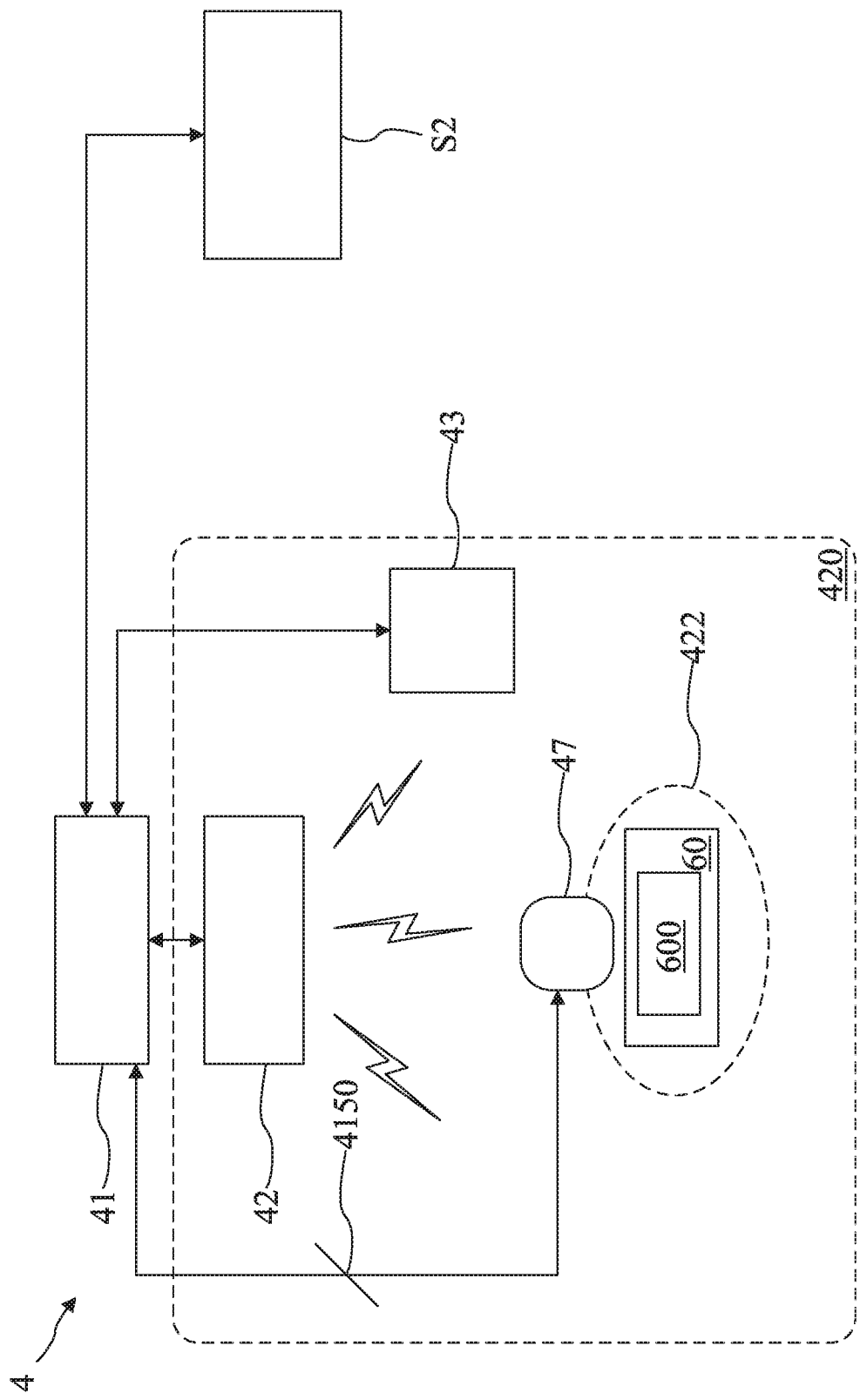
FIG. 4F is a schematic diagram illustrating the applied environment of the security system in accordance with some embodiments of the present disclosure.

Please refer to FIG. 4F, which is a schematic diagram illustrating the applied environment of the security system 4 in accordance with some embodiments of the present disclosure. In these embodiments, some reminders may be configured for reminding the user who carries the object 60 with the identification 600 at some locations or at some times within the detection coverage 420.

In detail, a reminder, which is used for reminding the user to perform action 'C' while the user is at a position 422 during a period 'T3' of time, may be preconfigured in the security device 41. Accordingly, when the detection module 42 detects the identification 600 at the position 422 within the detection coverage 420 during the period 'T3' of time, the processing unit 415 may transmit a notifying signal 4150 to a speaker 47 for playing sound based on the notifying signal 4150 for remaindering the user to perform action 'C'.

For example, a reminder is preconfigured for reminding the user to perform an action 'check door lock' while the user is at a position of 'bed' during a period '21:00~23:00' of time. Accordingly, when the detection module 42 detects the user who carries the object 60 with identification 600 at the position of 'bed' within the detection coverage 420 during the period '21:00~23:00' of time, the processing unit 415 may transmit the notifying signal 4150 to the speaker 47 for playing sound based on the notifying signal 4150 for remaindering the user to perform the action 'check door lock'.

In some embodiments, the speak 47 may be disposed: (1) at the position 422; (2) in the detection module 42; or (3) in the object 60 (e.g., a mobile device). In some embodiments, the detection module 42 may cooperate with a plurality of sensors or detectors, which are disposed within the detection coverage 420, for locating the position of the identification 600. However, it is not intended to limit the hardware implementation embodiments of the present disclosure.

Figure 4G:
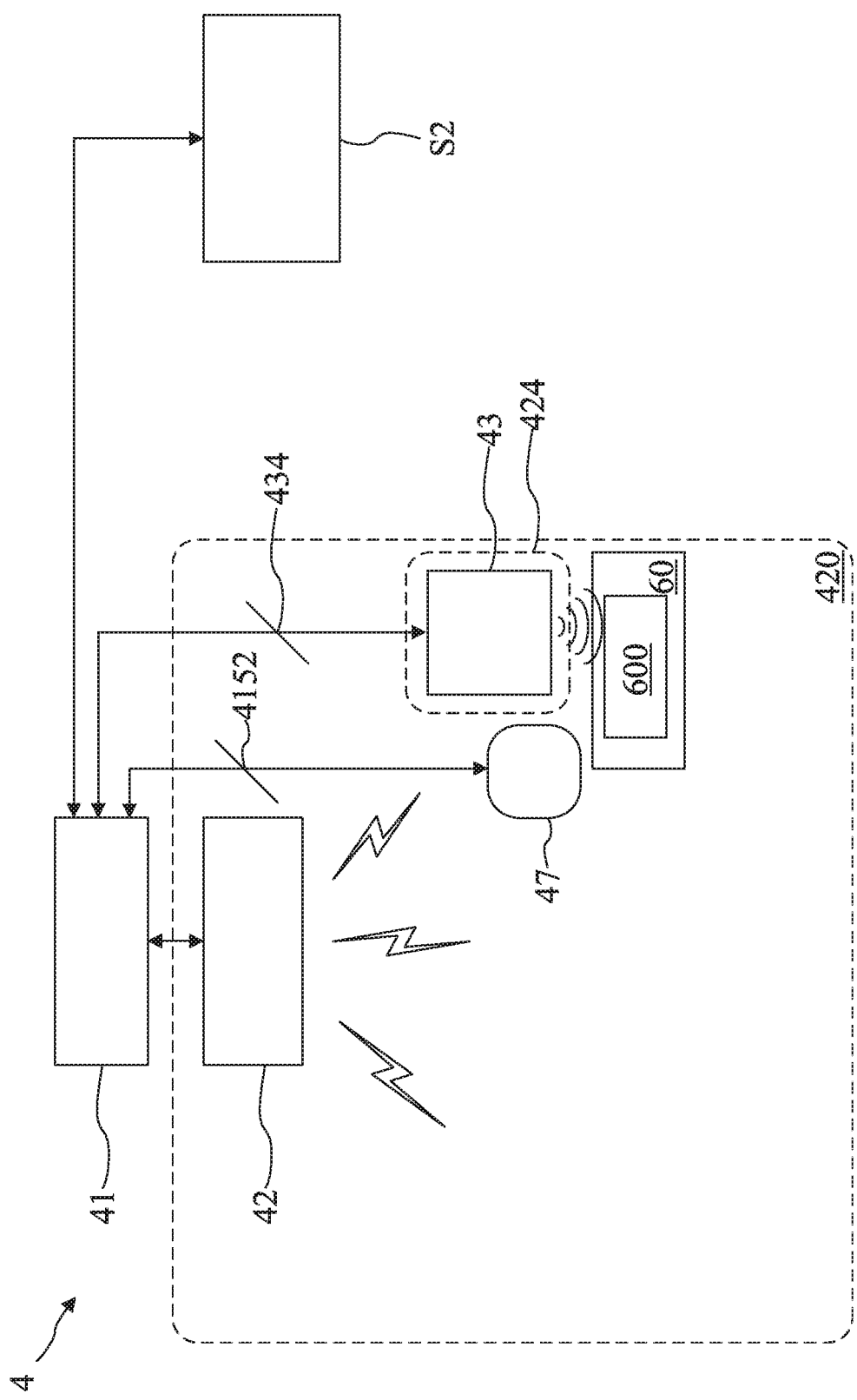
FIG. 4G is a schematic diagram illustrating the applied environment of the security system in accordance with some embodiments of the present disclosure.

Please refer to FIG. 4G, which is a schematic diagram illustrating the applied environment of the security system 4 in accordance with some embodiments of the present disclosure. In these embodiments, some reminders may be configured for reminding the user who carries the object 60 with the identification 600 at some locations or at some times within the detection coverage 420.

In detail, a reminder, which is used for reminding the user to perform action 'D' while the user is at a position 424 during a period 'T4' of time, may be preconfigured in the security device 41. In these embodiments, the motion sensor 43 may be disposed at the position 424. Accordingly, when the user who carries the object 60 with the identification 600 moves toward the position 424, the motion sensor 43 may detect the user and transmit a sensing signal 434 to the first I/O module 411. In other words, the first I/O module 411 receives the sensing signal 434 from the motion sensor 43 disposed at the position 424.

Next, the processing unit 415 determines whether the sensing signal 434 is received during the period 'T4' of time. When the sensing signal 434 is not received during the period 'T4' of time, the sensing signal 434 may be ignored. When the sensing signal 434 is received during the period 74' of time, the processing unit 415 may transmit a notifying signal 4152 to the speaker 47 for playing sound based on the notifying signal 4152 for remaindering the user to perform action 'D'.

For example, the motion sensor 23 is disposed at the 'front door' and a reminder is preconfigured for reminding the user to perform an action 'bring keys' during a period '08:00~10:00' of time. Accordingly, when the user who carries the object 60 with the identification 600 moves toward the 'front door', the motion sensor 43 may detect the user and transmit the sensing signal 434 to the first I/O module 411. In other words, the first I/O module 411 receives the sensing signal 434 from the motion sensor 43 disposed at the 'front door'.

Next, the processing unit 415 determines whether the sensing signal 434 is received during the period '08:00~10:00' of time. When the sensing signal 434 is not received during the period '08:00~10:00' of time, the sensing signal 434 may be ignored. When the sensing signal 434 is received during the period '08:00~10:00' of time, the processing unit 415 may transmit the notifying signal 4152 to the speaker 47 for playing sound based on the notifying signal 4152 for remaindering the user to perform action 'bring keys'.

Figure 4H:
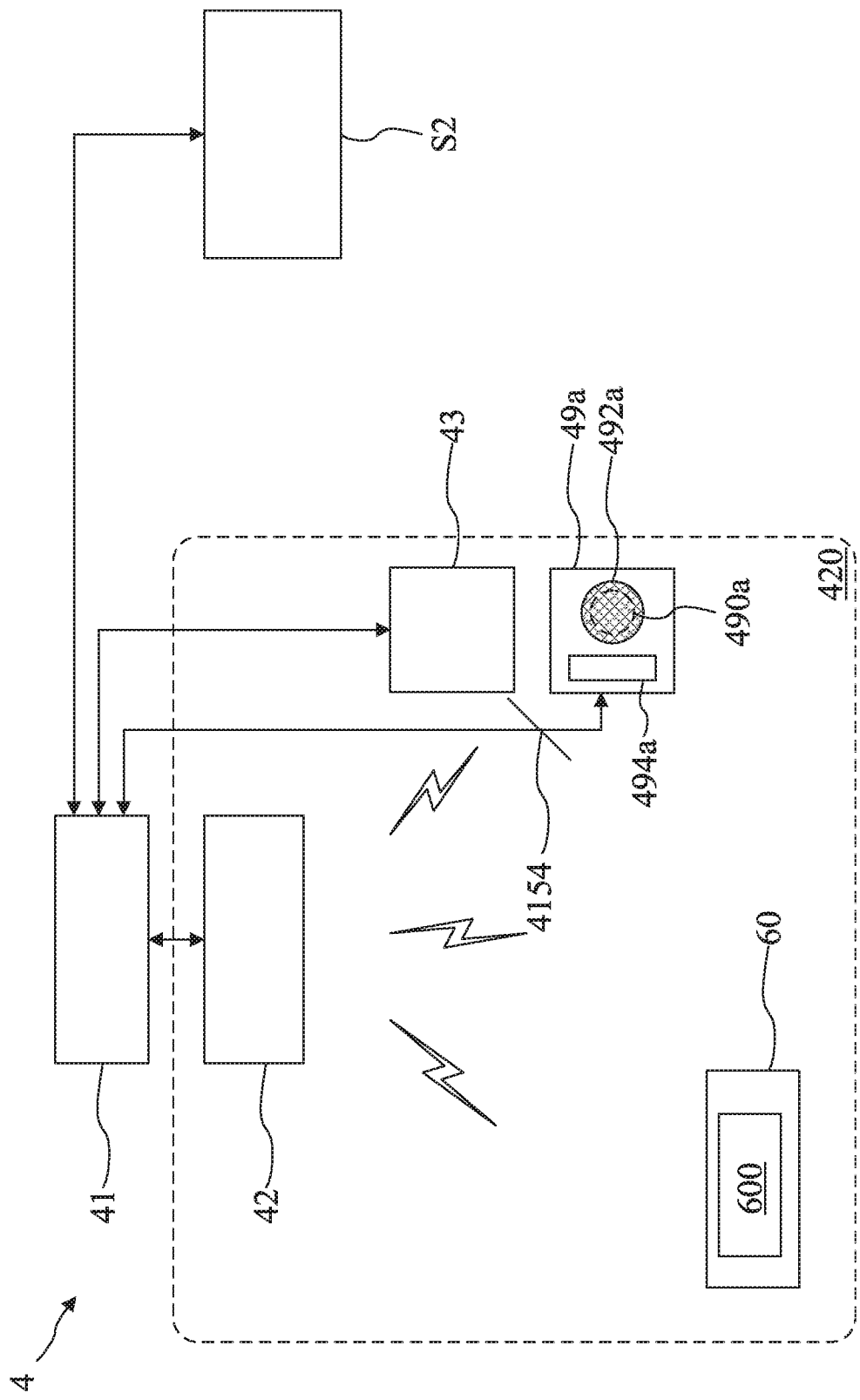
FIG. 4H is a schematic diagram illustrating the applied environment of the security system in accordance with some embodiments of the present disclosure.

Please refer to FIG. 4H, which is a schematic diagram illustrating the applied environment of the security system 4 in accordance with some embodiments of the present disclosure. The security system 4 further includes a camera module 49a. The security device 41 may further communicate with the camera module 49a via the first I/O module 411. The camera module 49a is disposed for monitoring the environment. It should be noted that the camera module 29a is activated while the security device 41 is set as alarmed mode. On the other hand, when the user who carries the object 60 with the identification 600 is within the detection coverage 420 and the security device 41 is set as unalarmed mode, the camera module 49a is inactivated for protecting the privacy of the user.

In some embodiments, the camera module 49a is inactivated by physical mechanism. In detail, the camera module 49a includes a lens 490a, a physical mask 492a and a controller 494a. The security device 41 communicates with the camera module 49a via the first I/O module 411 and the controller 494a. When the identification 600 is enabled within the detection 420 coverage of the detection module 42, the processing unit 415 sets the security device 41 as the unalarmed mode and transmits a control signal 4154 to the camera module 49a by the detection module 411.

After receiving the control signal 4154, the controller 494a of the camera module 49a activates the physical mask 492a for covering the lens 490a of the camera 49a. Accordingly, the camera module 49a is substantially inactivated since the recording of the environment is failed due to the activation of the physical mask 492a.

Figure 4I:
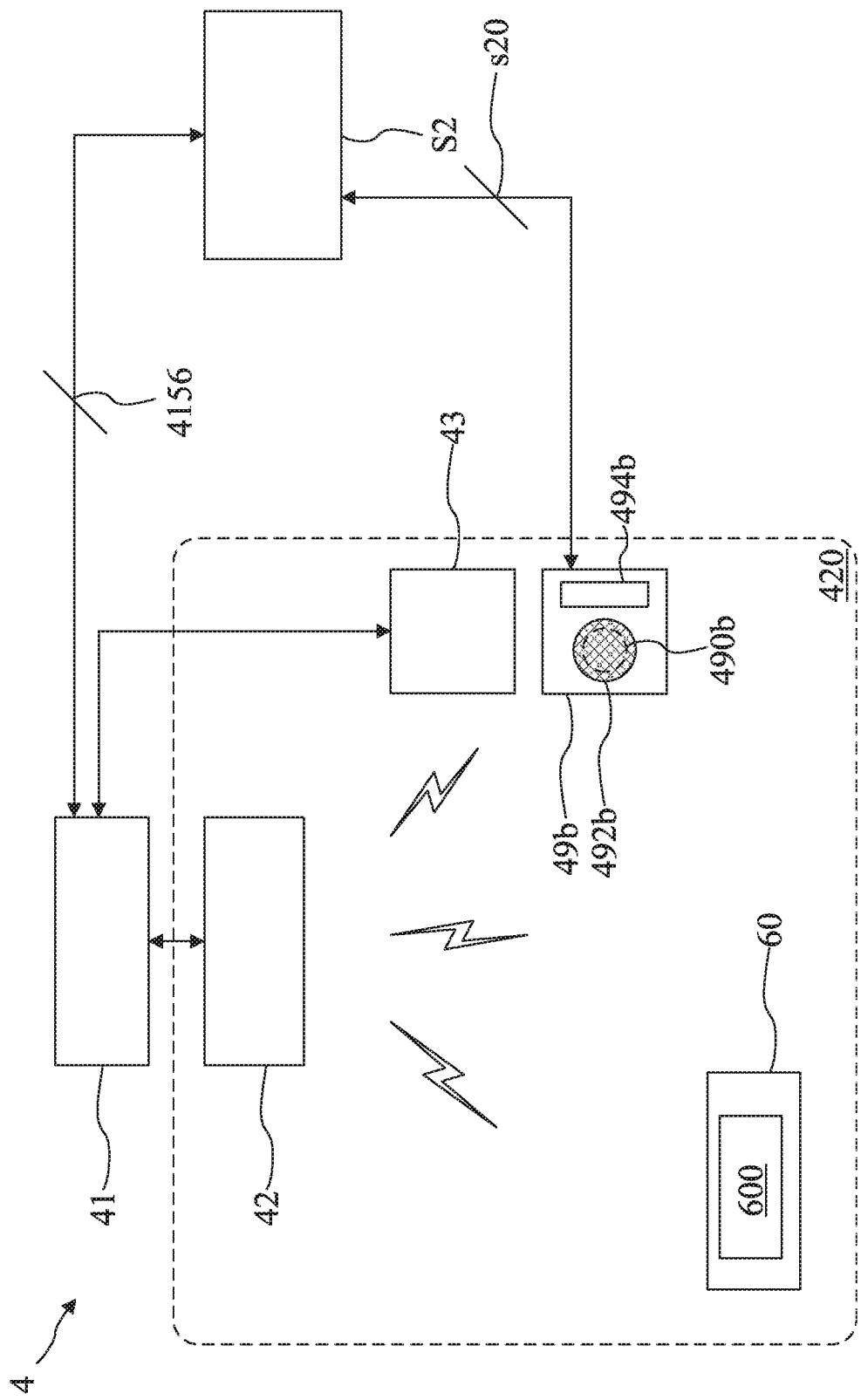
FIG. 4I is a schematic diagram illustrating the applied environment of the security system in accordance with some embodiments of the present disclosure.

Please refer to FIG. 4I, which is a schematic diagram illustrating the applied environment of the security system 4 in accordance with some embodiments of the present disclosure. In these embodiments, the server S2 connects with a camera module 49b. Therefore, the security device 41 may further communicate with the camera module 29b via the server S2. Similarly, the camera module 49b is disposed for monitoring the environment.

It should be noted that the camera module 49b is activated while the security device 41 is set as alarmed mode. On the other hand, when the user who carries the object 60 with the identification 600 is within the detection coverage 420 and the security device 41 is set as unalarmed mode, the camera module 49b is inactivated for protecting the privacy of the user.

In some embodiments, the camera module 49b is inactivated by physical mechanism. In detail, the camera module 49b includes a lens 490b, a physical mask 492b and a controller 494b. When the identification 600 is enabled within the detection 420 coverage of the detection module 411, the processing unit 415 sets the security device 41 as the unalarmed mode and transmits a control signal 4156 to the server S2 by the second/O module 413.

After receiving the control signal 4156, the server S2 transmits a control signal s20 to the controller 494b of the camera module 49b for the controller 494b to activate the physical mask 492b for covering the lens 490b of the camera 49b. Accordingly, the camera module 49b is substantially inactivated since the recording of the environment is failed due to the activation of the physical mask 492b.

Figure 4J:
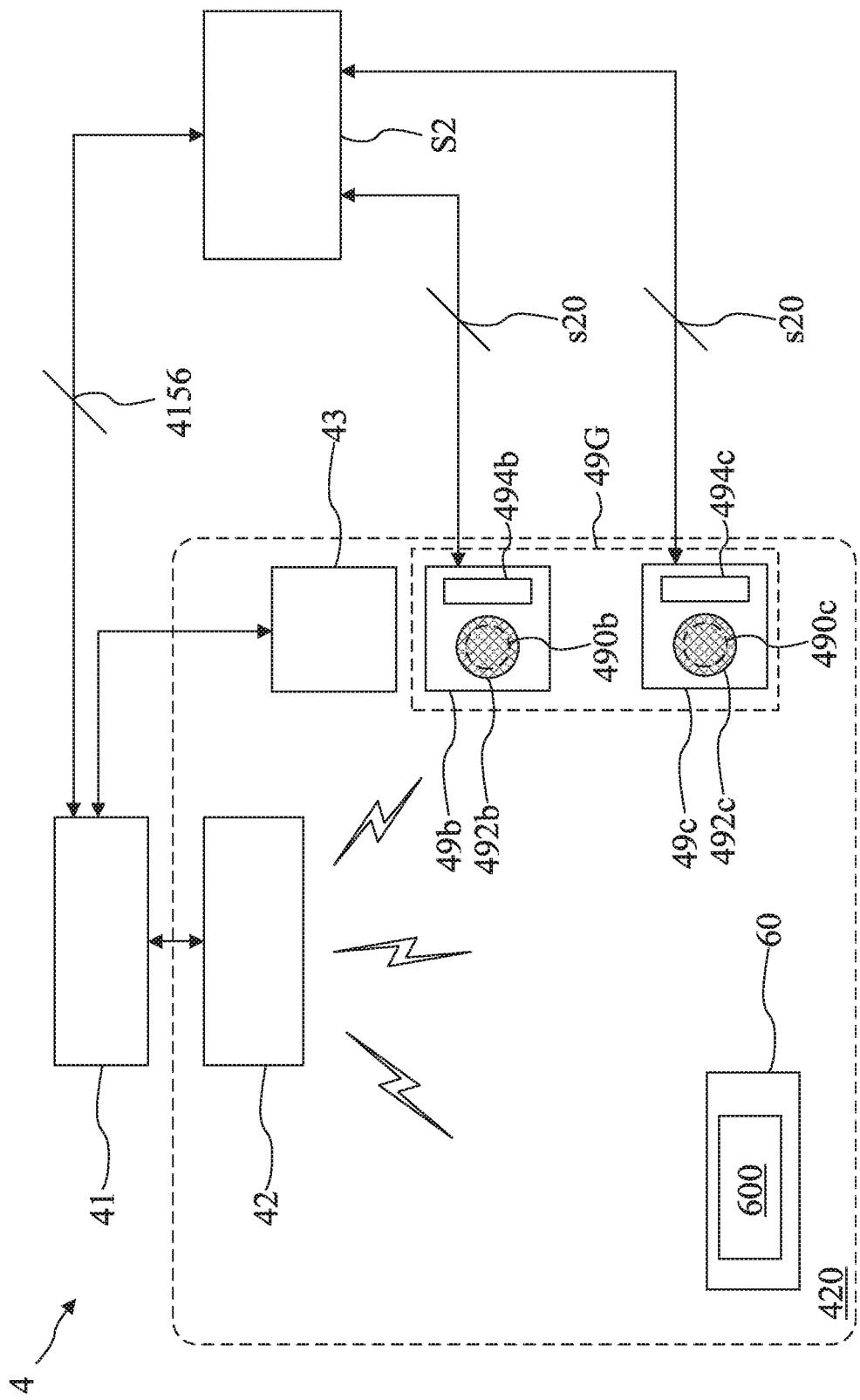
FIG. 4J is a schematic diagram illustrating the applied environment of the security system in accordance with some embodiments of the present disclosure.

Please refer to FIG. 4J, which is a schematic diagram illustrating the applied environment of the security system 4 in accordance with some embodiments of the present disclosure. The server S2 connects with a camera group 49G while the camera 49G includes the camera module 49b and a camera module 49c at least. The camera module 49c includes a lens 490c, a physical mask 492c and a controller 494c.

In these embodiments, when the processing unit 415 transmits the control signal 4156 to the server S2 for inactivating the camera module 49b, the server S2 inactivates all the camera modules of the camera group 49G related to the camera module 49b. In detail, after receiving the control signal 4156, the server S2 transmits the control signal s20 to the camera modules, which are the camera modules 49b and 49c, of the camera group 49G. Accordingly, the controllers 494b and 494c of the camera modules 49b and 49c activate the physical mask 492b and 492c for covering the lens 490b and 490c based on the control signal s20 respectively. Therefore, the camera module 49b and 49c are substantially inactivated since the recordings of the environment are failed due to the activations of the physical masks 492b and 492c.

Although the present disclosure and its advantages have been described in detail, it should be understood that various changes, substitutions and alterations can be made herein without departing from the spirit and scope of the disclosure as defined by the appended claims. For example, the processing unit mentioned in the above embodiments may be a central processing unit (CPU), other hardware circuit elements capable of executing relevant instructions, or combination of computing circuits that shall be well-appreciated by those skilled in the art based on the above disclosures. The storing units mentioned in the above embodiments may be memories for storing data.

Further, the first I/O module and the detection module mentioned in the above embodiments may be Bluetooth modules with micro controllers. The object with identification mentioned in the above embodiments may be a physical electronic tag compatible with Bluetooth. The object with the identification mentioned in the above embodiments may further be a mobile device (e.g., cellphone, personal digital assistant, etc.) compatible with Bluetooth. The network and protocol used between the first I/O module/detection module and the object with identification may be compatible with Bluetooth Low Energy or more advanced techniques.

Moreover, the second I/O module mentioned in the above embodiments may be may be a combination of a network data transmitter and a network data receiver which are compatible with Wi-Fi network, $3^{rd}$ Generation network, $4^{th}$ Generation network, $5^{th}$ Generation network or more advanced techniques. However, it is not intended to limit the hardware implementation embodiments of the present disclosure.

Furthermore, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A security device, comprising:
   a first input/output (I/O) module, being configured to detect an identification within a detection coverage;
   a processing unit, being electrically coupled to the first I/O module, and being configured to:
     determine that the identification is registered with the security device;
     set the security device as an unalarmed mode when the identification is enabled within the detection coverage of the first I/O module; and
     set the security device as an alarmed mode when the identification is disabled within the detection coverage of the first I/O module;
   wherein the first I/O module is further configured to detect the identification at a position within the detection coverage at a predetermined time, and the processing unit is further configured to:
     transmit a notifying signal to a speaker based on that the identification is at the position at the predetermined time when the identification is enabled so that the speaker is capable of playing sound based on the notifying signal.

2. A security device, comprising:
   a first input/output (I/O) module, being configured to detect an identification within a detection coverage;
   a processing unit, being electrically coupled to the first I/O module, and being configured to:
     determine that the identification is registered with the security device;
     set the security device as an unalarmed mode when the identification is enabled within the detection coverage of the first I/O module; and
     set the security device as an alarmed mode when the identification is disabled within the detection coverage of the first I/O module;
   wherein the first I/O module is further configured to receive a sensing signal from a motion sensor disposed at a position, and the processing unit is further configured to:

transmit a notifying signal to a speaker based on receiving the sensing signal at the predetermined time when the identification is enabled so that the speaker is capable of playing sound based on the notifying signal.

3. A security device, comprising:
a first input/output (I/O) module, being configured to detect an identification within a detection coverage;
a processing unit, being electrically coupled to the first I/O module, and being configured to:
determine that the identification is registered with the security device;
set the security device as an unalarmed mode when the identification is enabled within the detection coverage of the first I/O module; and
set the security device as an alarmed mode when the identification is disabled within the detection coverage of the first I/O module;
wherein the first I/O module is further configured to communicate with a camera module, and the processing unit is further configured to:
transmit a control signal to the camera module by the first I/O module to activate a physical mask of the camera module when the identification is enabled within the detection coverage of the first I/O module.

4. A security device, comprising:
a first input/output (I/O) module, being configured to detect an identification within a detection coverage;
a processing unit, being electrically coupled to the first I/O module, and being configured to:
determine that the identification is registered with the security device;
set the security device as an unalarmed mode when the identification is enabled within the detection coverage of the first I/O module; and
set the security device as an alarmed mode when the identification is disabled within the detection coverage of the first I/O module;
a second I/O module, being configured to communicate with a camera module via a server;
wherein the processing unit is further configured to:
transmit a control signal to the camera module by the second I/O module through the server to activate a physical mask of the camera module when the identification is enabled within the detection coverage of the first I/O module.

5. A security device, comprising:
a first input/output (I/O) module, being configured to detect an identification within a detection coverage;
a processing unit, being electrically coupled to the first I/O module, and being configured to:
determine that the identification is registered with the security device;
set the security device as an unalarmed mode when the identification is enabled within the detection coverage of the first I/O module; and
set the security device as an alarmed mode when the identification is disabled within the detection coverage of the first I/O module;
a second I/O module, being configured to communicate with a server;
wherein the processing unit is further configured to:
transmit a control signal, which is used for activating a first physical mask of a first camera module, to the server by the second I/O module so that the server activates at least one second physical of at least one second camera.

6. A security system, comprising:
a detection module, being configured to detect an identification within a detection coverage;
a security device, comprising:
a first input/output (I/O) module, being configured to communicate with the detection module;
a processing unit, being electrically coupled to the first I/O module, and being configured to:
determine that the identification received from the detection module is registered with the security device;
set the security device as an unalarmed mode when the identification is enabled within the detection coverage of the detection module; and
set the security device as an alarmed mode when the identification is disabled within the detection coverage of the detection module;
wherein the detection module is further configured to detect the identification at a position within the detection coverage at a predetermined time;
wherein the processing unit is further configured to:
transmit a notifying signal to a speaker based on that the identification is at the position at the predetermined time when the identification is enabled so that the speaker is capable of playing sound based on the notifying signal.

7. A security system, comprising:
a detection module, being configured to detect an identification within a detection coverage;
a security device, comprising:
a first input/output (I/O) module, being configured to communicate with the detection module;
a processing unit, being electrically coupled to the first I/O module, and being configured to:
determine that the identification received from the detection module is registered with the security device;
set the security device as an unalarmed mode when the identification is enabled within the detection coverage of the detection module; and
set the security device as an alarmed mode when the identification is disabled within the detection coverage of the detection module;
a motion sensor disposed at a position within the detection coverage, communicating with the security device via the first I/O module, and being configured to transmit a sensing signal to the security device while sensing motion;
wherein the processing unit is further configured to:
transmit a notifying signal to a speaker based on receiving the sensing signal at a predetermined time when the identification is enabled so that the speaker is capable of playing sound based on the notifying signal.

8. A security system, comprising:
a detection module, being configured to detect an identification within a detection coverage;
a security device, comprising:
a first input/output (I/O) module, being configured to communicate with the detection module;
a processing unit, being electrically coupled to the first I/O module, and being configured to:
determine that the identification received from the detection module is registered with the security device;

set the security device as an unalarmed mode when the identification is enabled within the detection coverage of the detection module; and set the security device as an alarmed mode when the identification is disabled within the detection coverage of the detection module;

a camera module, communicating with the security device via the first I/O module, and comprising:
  a camera device with a lens; and
  a physical mask for blocking the lens while being activated;

wherein the processing unit is further configured to:
  transmit a control signal to the camera module by the first I/O module to activate the physical mask of the camera module when the identification is enabled within the detection coverage of the detection module.

9. A security system, comprising:
a server, being connected with a first camera module;
a detection module, being configured to detect an identification within a detection coverage;
a security device, comprising:
  a first input/output (I/O) module, being configured to communicate with the detection module;
  a second I/O module, being configured to communicate with the server;
  a processing unit, being electrically coupled to the first I/O module, and being configured to:
    determine that the identification received from the detection module is registered with the security device;
    set the security device as an unalarmed mode when the identification is enabled within the detection coverage of the detection module; and
    set the security device as an alarmed mode when the identification is disabled within the detection coverage of the detection module;
    transmit a control signal to the server by the second I/O module for activating a first physical mask of the first camera module when the identification is enabled within the detection coverage of the detection module;

wherein the server is further configured to:
  activate the first physical mask of the first camera module based on the control signal.

10. The security system of claim 9, wherein the server is further connected with a second camera and configured to:
activate a second physical mask of the second camera module based on the control signal.

* * * * *